United States Patent
Owejan

(10) Patent No.: US 10,612,184 B2
(45) Date of Patent: Apr. 7, 2020

(54) HYDRONIC DRYING MACHINE

(71) Applicant: The Research Foundation for SUNY, Albany, NY (US)

(72) Inventor: Jon P. Owejan, Honeoye, NY (US)

(73) Assignee: The Research Foundation for SUNY, Albany, NY (US)

(*) Notice: Subject to any disclaimer, the term of this patent is extended or adjusted under 35 U.S.C. 154(b) by 178 days.

(21) Appl. No.: 15/458,983

(22) Filed: Mar. 15, 2017

(65) Prior Publication Data
US 2017/0268158 A1 Sep. 21, 2017

Related U.S. Application Data

(60) Provisional application No. 62/308,767, filed on Mar. 15, 2016.

(51) Int. Cl.
*F26B 19/00* (2006.01)
*D06F 58/26* (2006.01)
*D06F 58/28* (2006.01)
*D06F 58/20* (2006.01)

(52) U.S. Cl.
CPC ........... *D06F 58/26* (2013.01); *D06F 58/20* (2013.01); *D06F 58/28* (2013.01); *D06F 2058/289* (2013.01); *D06F 2058/2829* (2013.01); *D06F 2058/2864* (2013.01)

(58) Field of Classification Search
CPC ......... D06F 58/10; D06F 58/206; D06F 58/26
USPC ..................... 34/86, 72, 427, 428
See application file for complete search history.

(56) References Cited

U.S. PATENT DOCUMENTS

| | | | |
|---|---|---|---|
| 2012/0000089 A1* | 1/2012 | Scherb | D21F 3/0272 34/444 |
| 2014/0352166 A1* | 12/2014 | Ertel | D06F 58/02 34/73 |
| 2016/0053427 A1* | 2/2016 | Noh | D06F 58/28 34/427 |
| 2017/0268159 A1* | 9/2017 | Brown | D06F 58/02 |

* cited by examiner

*Primary Examiner* — John P McCormack
(74) *Attorney, Agent, or Firm* — Steven A. Wood; Peter J. Evangelatos

(57) ABSTRACT

The present disclosure provides system and method for drying various materials using an air-to-air heat exchanger in sequence with a liquid-to-air heat exchanger to provide heat to a chamber to remove moisture from materials contained within the chamber in an energy efficient manner.

24 Claims, 21 Drawing Sheets

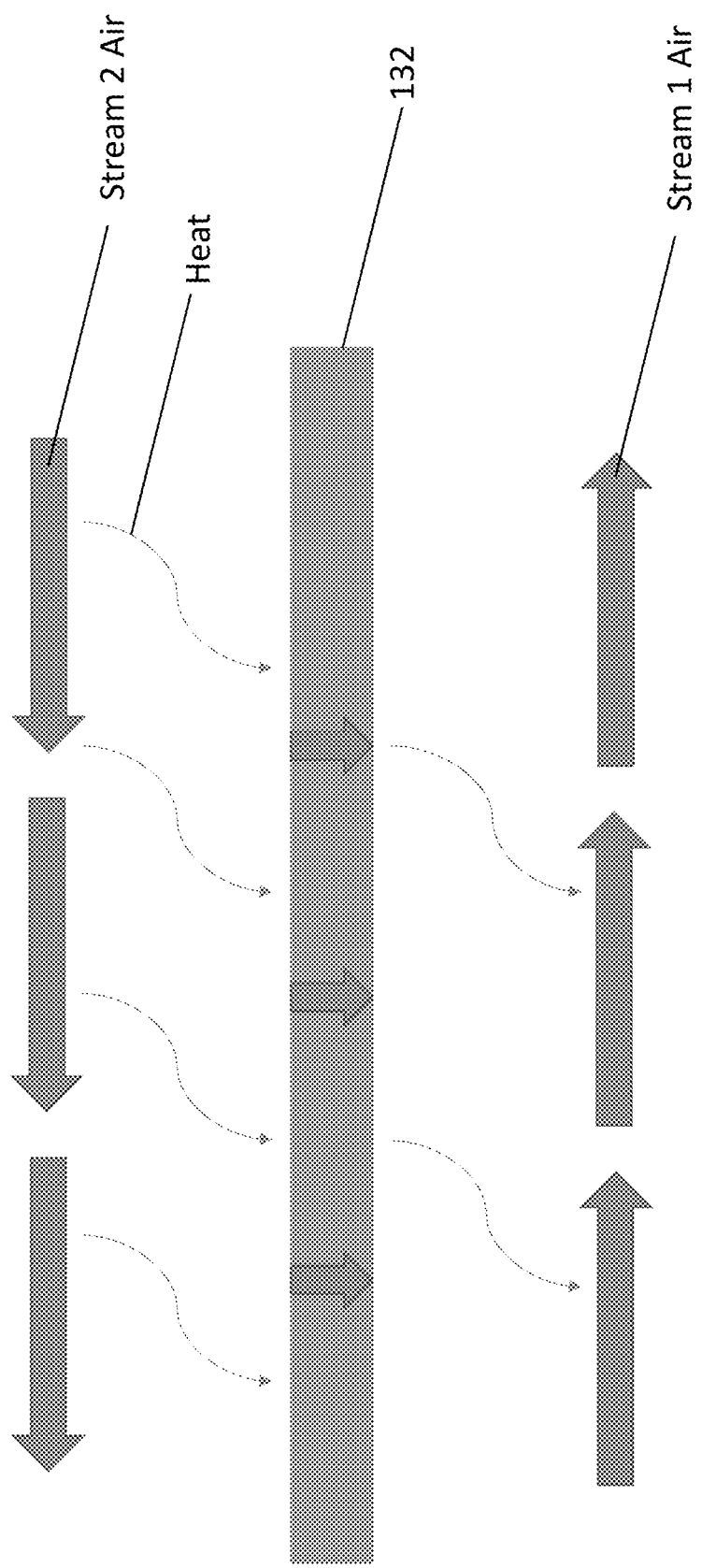

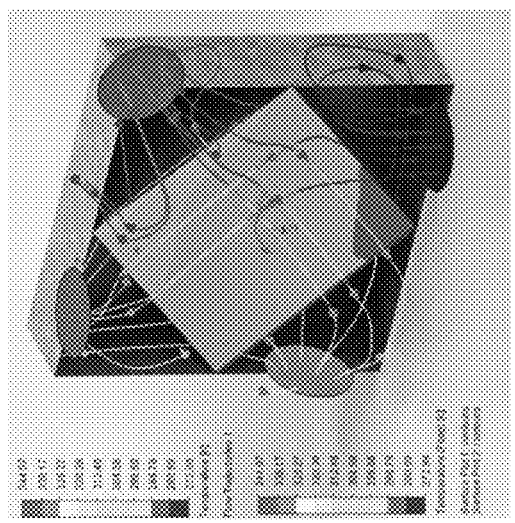
Figure 7C
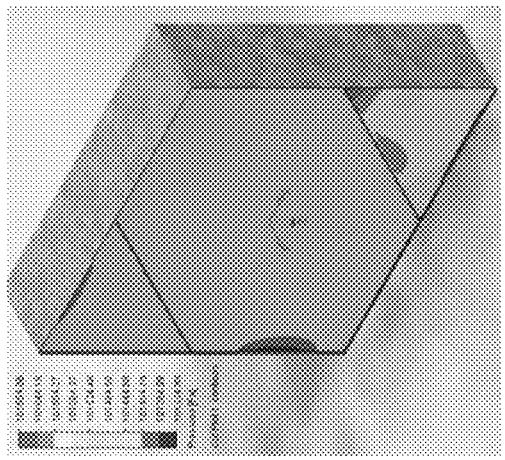
Figure 7B
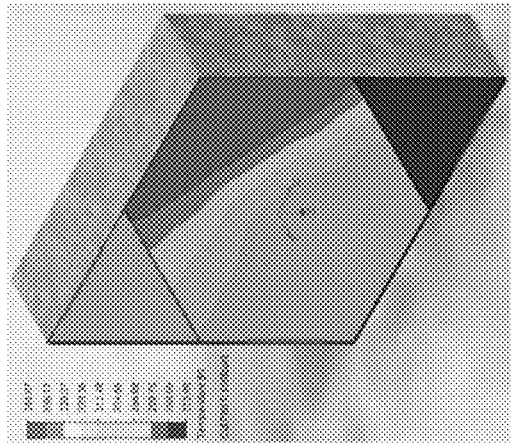
Figure 7A
Figure 7

HYDRONIC DRYING MACHINE

RELATED APPLICATIONS

This application claims priority to U.S. Provisional Application No. 62/308,767, filed Mar. 15, 2016 and entitled HYDRONIC DRYING MACHINE.

BACKGROUND

1. Field

The present disclosure relates to an energy efficient materials dryer, and, more particularly, to a thermal airflow management system featuring a hydronic heating element.

2. Description of Related Art

Dryers are among several common appliances used both in households and larger industrial settings such as hotels or laundries to dry clothes and linens. They may also be used on a larger scale to dry lumber, food, plastics, and tobacco. Dryers generally include a heated chamber where wet materials are placed for a period of time to allow moisture to evaporate, and may also include a trap to collect excess material such as lint, fibers or dirt, as well as a series of controls to select duration and heat strength of a drying cycle. Industrial dryers often feature a heat source that heats air in one chamber that is blown over wet materials in another chamber.

Clothes dryers may be found as an individual appliance, or sold as a combined washer-dryer unit. Conventional home dryers utilize an internal heat source, such as an electric coil or gas-fed burner, to deliver sufficient heat to evaporate moisture, and typically require adequate and constant heat to maintain a desirable chamber temperature to dry clothes or other textiles. As a result, conventional clothes dryers across the United States account for approximately 160 billion pounds of $CO_2$ emissions every year.

Dryers must comply with local building codes to protect against fires that may arise from a build-up of waste materials. In 2010, almost 17,000 dryer fires accounted for approximately 450 injuries and deaths and nearly $240 million in property damage, in the U.S. alone. Over a third of these fires result from a failure to clean lint from the dryer exhaust ventilation ducts. The fire risk presented by an open heating source in conventional home dryers calls for frequent maintenance to ensure that lint does not build up to the point that it will combust.

Further, conventional home dryers use air from inside the house and exhaust this indoor-air into the outdoors as hot humid air after it has been cycled through the dryer. This creates a negative pressure within the home or other building that draws untreated outdoor-air into the structure. Inefficiency results from the need to condition both the indoor-air drawn into the dryer as well as the influx of untreated outdoor-air that caused by the negative pressure resulting from the dryer exhaust. Therefore, there is a need in the industry for improved dryer systems that improves safety and better manages energy efficiency.

SUMMARY

The following is a summary of the invention in order to provide a basic understanding of some aspects of the invention. This summary is not intended to identify all key or critical elements of the invention or to delineate the entire scope of the invention. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The present invention comprises an air-to-air heat exchanger ("AA"), a liquid-to-air heat exchanger ("LA"), a drying chamber, an air blower, e.g., a motorized fan or other means to push air through the system, and fluid conduits, in fluid communication with the various system components. This system of components included in the present invention enables the movement of heated air over wet materials at a consistent temperature for a specific amount of time. The air blower pulls outdoor-air through an outdoor-air intake into the system, wherein the various elements are connected via a series of ducts or fluid conduits. Specifically, these fluid conduits connect the inlet port to a first stage of the AA, the AA to the LA, and the LA to the drying chamber, the drying chamber to a second stage of the AA, and the second stage of the AA to an outlet port through which dryer air may be exhausted into the outdoors.

The AA provides the incoming outdoor-air with heat that is recycled from hot humid air leaving the drying chamber through the second stage of the AA. The LA supplies air received from the first stage of the AA with additional heat provided by a liquid heat-transfer medium, which is heated by an external heat source. Air heated by the LA passes into the dryer chamber and transfers heat to materials contained therein, causing moisture contained within those materials to evaporate creating humidity. Hot humid air then passes from the drying chamber into the second stage of the AA, which captures heat from this air before it is exhausted into the outdoors and transmits that heat to the incoming outdoor-air, as previously described.

In one embodiment, air exits the AA through a dryer-air outtake, into the outside atmosphere as exhaust. In another embodiment, air is recycled through the system, wherein air is circulated from the AA, through the LA, into the drying chamber, into the AA and then back into the LA, etc., and is not transmitted into the outside atmosphere as exhaust. In this second embodiment humidity is condensed out of the air at the second stage of the AA.

The LA liquid heat-transfer medium may be heated by various types of heat sources, such as a boiler, heat pump, e.g., ground-source, geothermal, incinerator, thermal-solar panel, thermo-electric, or by waste heat produced by a generator or motor, e.g., combined heat and power systems.

In practice, the air blower, e.g., motorized fan, is activated when a user begins a drying cycle, and creates air flow through the fluid conduits. Air is continuously pushed through the fluid conduits and heated initially by the AA and subsequently by the LA while the system is in operation. Upon completion of a drying cycle, the air blower is powered down, i.e., motor stops powering the fan, ceasing air flow.

BRIEF DESCRIPTION OF THE DRAWINGS

Non-limiting and non-exhaustive features will be described with reference to the following figures, wherein like reference numerals refer to like parts throughout the various figures. The figures below were not intended to be drawn to any precise scale with respect to size, angular relationship, or relative position.

FIG. 6 is a schematic that depicts the general heat flow through the plates of the heat exchange plate matrix.

FIG. 7 depicts three cut plots of the air-to-air heat exchanger, wherein 7A depicts the temperature cut plot, 7B depicts the pressure cut plot, and 7C depicts the flow trajectory.

FIG. 17 depicts two schematics that show air flow through the present invention, wherein

FIG. 19 shows different examples of the air-to-air heat exchanger, wherein

DETAILED DESCRIPTION

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof and the invention includes all such modifications, such as, but not limited to, the use of this heat management technology for the drying of timber, lumber, ship parts, pharmaceuticals, or for the drying of textiles such as clothes and linens.

The present invention comprises a novel system for thermal airflow management in drying systems, including at least an air-to-air heat exchanger, a liquid-to-air heat exchanger, a drying chamber, an air blower, e.g., a motorized fan or other means to push air through the system, and ducts or fluid conduits, in fluid communication with the various system components. The dryer system moves heated air over wet materials for a specified amount of time or until dry.

The air blower creates air flow by pushing air through the system and pulling outdoor-air through an outdoor-air intake into the system, wherein the various elements are connected via a series of fluid conduits. In preferred embodiments, the air may be supplied at a consistent temperature and/or a consistent flow rate.

The present invention provides a novel means of controlling air flow to dry various materials within a chamber and represents an improvement over other drying systems, including but not limited to those currently employed in home drying units for drying clothes, linens and other textiles, as well as larger industrial drying systems used to dry textiles, lumber, tobacco, pharmaceuticals and plastics, etc.

Clothes dryers are a common household appliance and are used to remove moisture from wet fabrics and textiles. On an industrial scale, clothes dryers are found in commercial laundry facilities and are similarly used to remove moisture from clothes, linens and other textiles. Specialized dryers are also used in the forestry industry to dry timber after it is cut into lumber.

Figure 1:
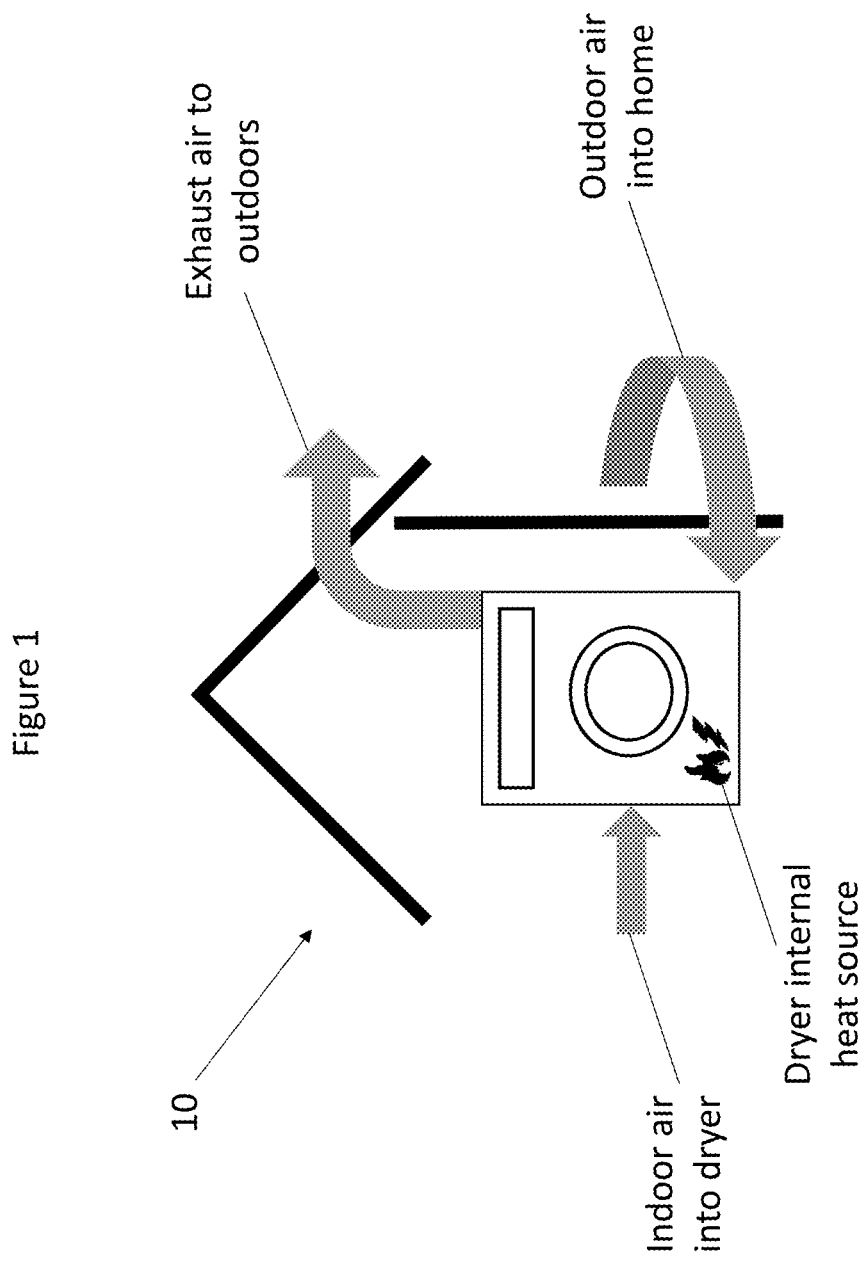
FIG. 1 depicts the heat source location and general flow of air through home dryer systems currently available on the market.

FIG. 1 depicts conventional state-of-the-art home dryer systems 10, wherein indoor air is pulled into a clothes dryer and heated by an internal heat source, such as an electric coil or natural gas heating element. Exhaust air, in turn, is deposited outdoors, resulting in a negative pressure condition within the home or other building, which in turn pulls unconditioned outdoor air into the building.

Figure 2:
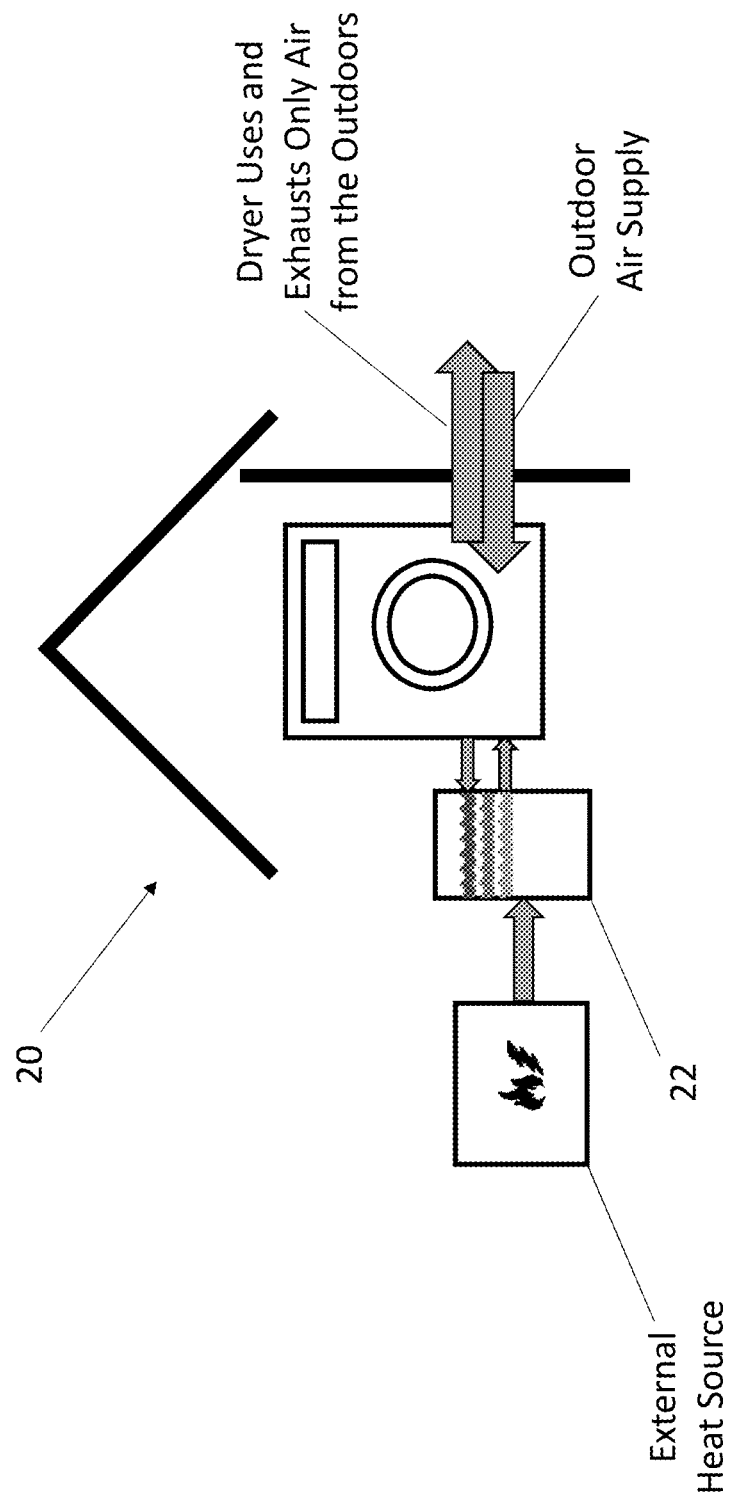
FIG. 2 depicts the heat source and general flow of air through the present invention.

In contrast, as depicted in FIG. 2, the dryer system 20 of the present invention features an independent heat source that heats a liquid heat-transfer medium, e.g., water, glycol, etc. The liquid heat-transfer medium delivers heat to the air used in the dryer system via the LA heat exchanger. Further, depending on the specific embodiment, air used by the dryer may either be drawn solely from the outdoors and redeposited outdoors after passing through the system or it may be drawn from the indoors and recycled within the dryer system without the need to draw outdoor-air into the system.

The present invention results in improved heating efficiency of the dryer system and improved efficiency in conditioning the air within the structure in which the present invention is operating, e.g., a home or other building. This improved efficiency is achieved by separating the air used for drying from the indoor-air or, alternatively, by separating the air used for drying from the outdoor-air. Specifically, the present invention avoids the creation of a negative pressure within the structure that occurs with conventional dryer systems by drawing in air from the outdoors and redepositing that same air outdoors, after it has been used in the drying process, or by recycling indoor-air used in the drying process.

In conventional clothes dryers, indoor-air enters the dryer machine and is heated and applied to clothes or other textiles in the dryer in order to drive moisture out of those fabrics. Then, building codes typically require that the hot humid air be exhausted to the outdoors to prevent encouraging the growth of mold. As conventional dryers include potential ignition sources, typically in the form of electrical resistance heating coils or flames in natural gas fired dryers, to help prevent accumulation of lint and other debris, and thereby also to help prevent dryer fires, building codes typically require that dryer exhaust outtakes be at least 4 inches in diameter.

However, venting the hot humid air from the dryer to the outdoors also has the side effect of creating a negative pressure within the building, causing unconditioned outdoor-air to flow into the building through cracks, windows and doors. Then, this outdoor-air that has entered the building needs to be re-conditioned to the appropriate temperature set by the building thermostat—generally either heated and humidified during the winter months or cooled and dehumidified during the summer months.

This results in a large inefficiency in indoor climate control during the summer months as indoor-air that has been chilled is then re-heated for use in the dryer and exhausted into the outdoors, causing the building air-conditioner(s) to expend additional energy to chill warm, unconditioned outdoor-air that enters the building to replace the hot humid air that has been exhausted from the dryer. Consequently, separation of outdoor-air and indoor-air in the present invention ensures that indoor-air is conditioned only as necessary to make the space suitable for humans, eliminates the need to condition newly entered outdoor-air replacing indoor-air exhausted from the dryer and thereby helps to prevent overworking air-conditioners.

Figure 3:
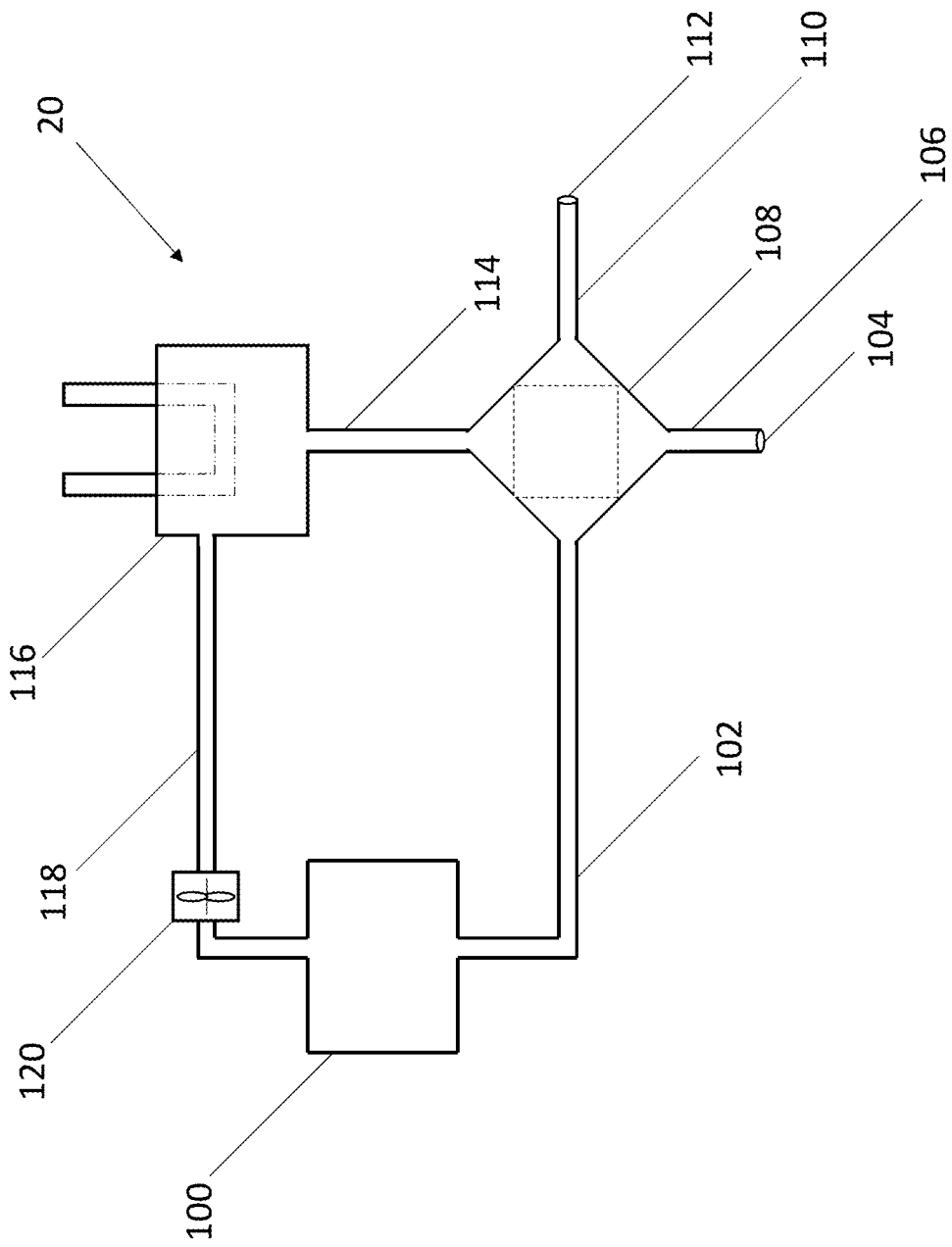
FIG. 3 is a schematic of the present invention, including the air-to-air heat exchanger, the liquid-to-air heat exchanger, and the drying chamber.

FIG. 3 depicts the present invention which is comprised of an AA 108, a LA 116, a primary blower 120, a drying chamber 100, an outdoor-air intake 104, a dryer-air outtake 112, and ducts or fluid conduits 102, 106, 110, 114 and 118. As shown in FIG. 3, the LA 116 and drying chamber 100 are connected downstream from the AA 108, wherein air having entered the AA through outdoor-air intake 104 and fluid conduit 106 leaves the AA 108 and travels through fluid conduit 114 to the LA 116 and then through fluid conduit 118 to the drying chamber 100.

As also shown in FIG. 3, air leaving the drying chamber 100 returns to the AA 108 through fluid conduit 102. Finally, air travels out of the AA, and through fluid conduit 110 to exit the system to the outdoor environment through the dryer-air outtake 112. The AA 108 functions to reclaim heat from air leaving the drying chamber and to transfer this recaptured heat to the new outdoor-air entering the AA from fluid conduit 106, thereby improving the efficiency of the cycle.

In one embodiment of the present invention ("energy recovery mode"), outdoor-air may be pulled into the dryer through an outdoor-air intake 104 and then transported through a system of fluid conduits by a primary blower, e.g., a fan or other means to push air through the system. First, this air is passed through the first stage 131 of the AA, where heat from the exhaust air is transferred via conduction through the AA plates 132 into the second stage 133 (see FIGS. 5 and 6).

Figure 9:
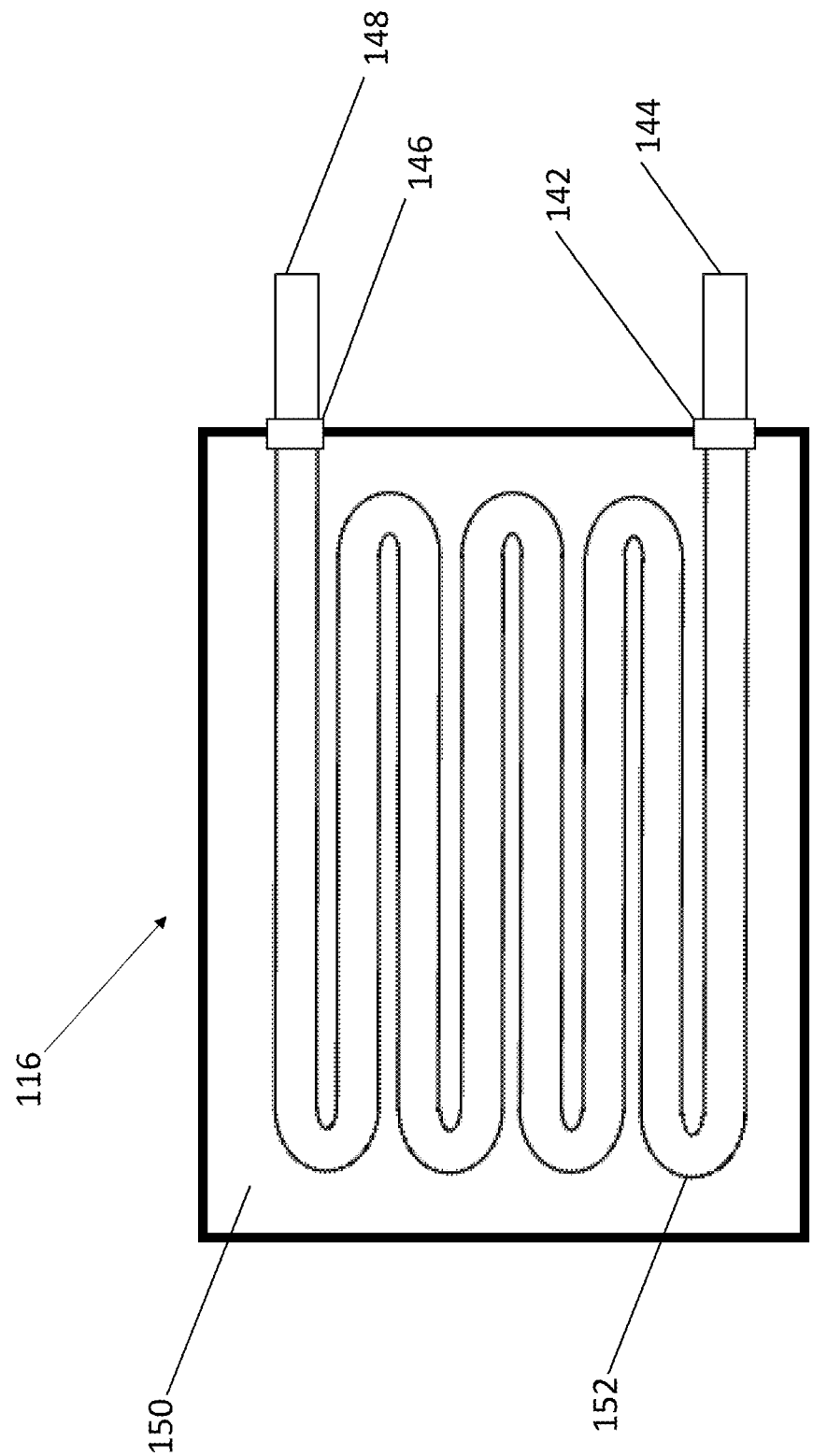
FIG. 9 is a schematic that depicts the general structure of the liquid-to-air heat exchanger from a front view with the air inlet and outlet ports removed.

Next, this warmed air is moved through a fluid conduit to the LA 116 (see FIG. 9), where a hydronic heat-transfer mechanism (e.g., one or more coiled pipes, filled with a hot liquid heat-transfer medium and including fins and/or vanes) 152 carries a hot liquid heat-transfer medium and conducts heat delivered by the hot liquid heat-transfer medium to the air, which then transmits this heat throughout the air mass contained within the fluid conduits and other components of the dryer via convection. The air heated by the LA 116 then flows through fluid conduit 118 into the drying chamber 100, where heat from the air causes moisture to evaporate from any material or materials within the drying chamber, thereby resulting in the air within the drying chamber becoming humidified.

Figure 4:
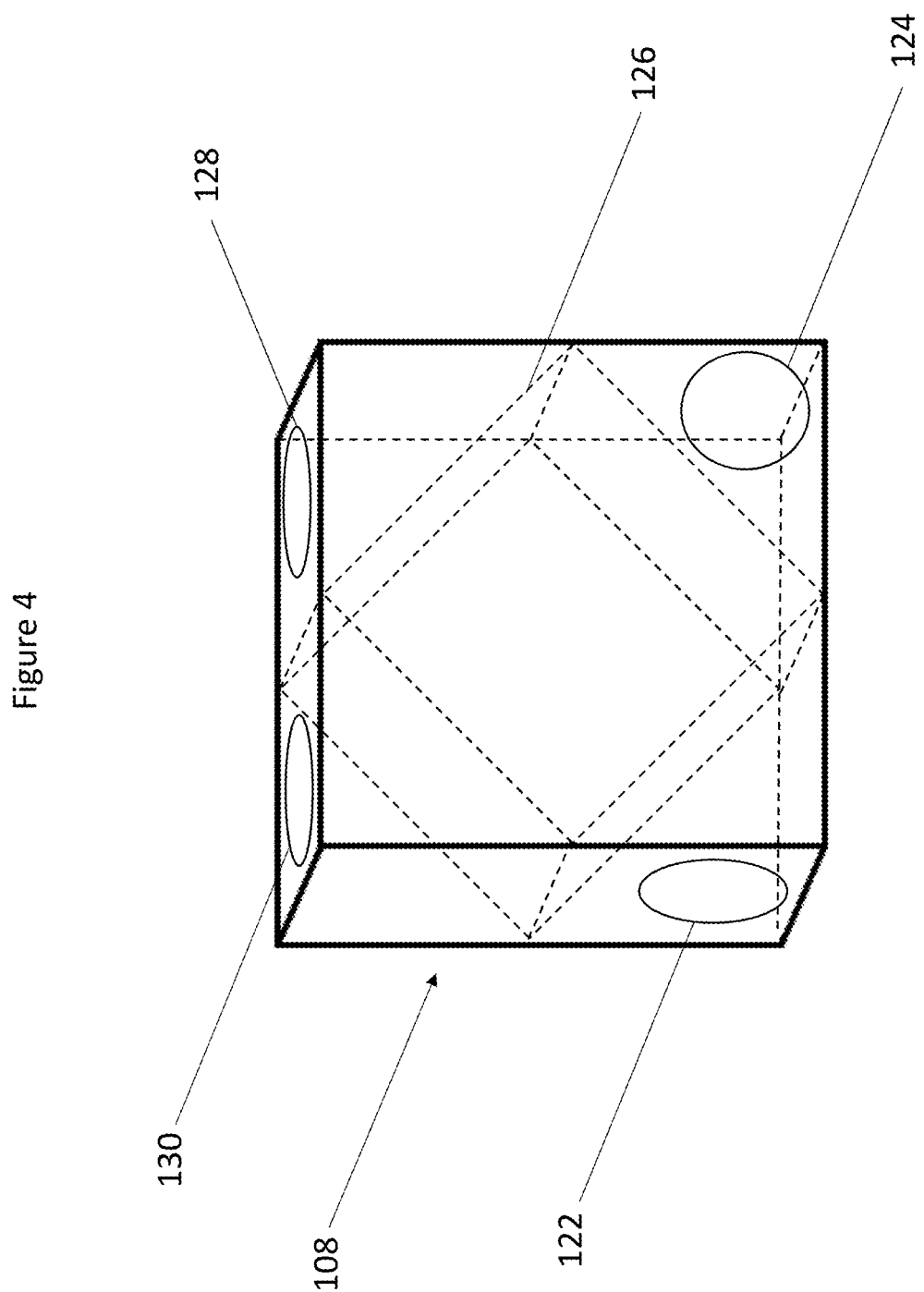
FIG. 4 depicts the air-to-air heat exchanger general structure, including the inlet and outlet ports.
Figure 5:
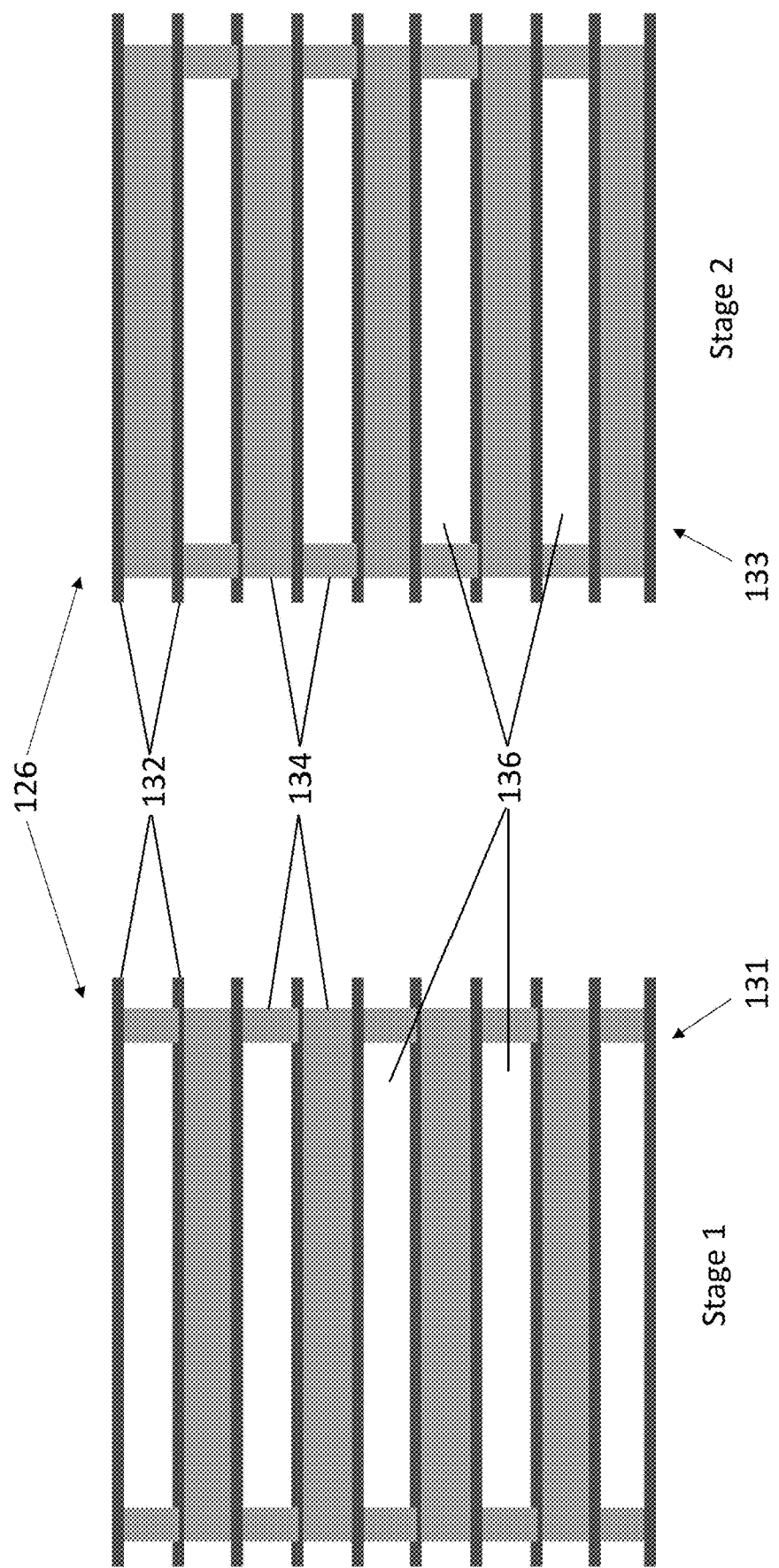
FIG. 5 is a schematic that depicts the heat exchange plate matrix in two separate views: front and side.

Hot humid air is then moved from the drying chamber and into the second stage of the AA 108 where heat from the hot humid air is absorbed by the AA plates 132 (see FIGS. 5 & 6), causing the air from the drying chamber to lose heat to the AA matrix 126 (see FIGS. 4 & 5). After having been cooled by contact with the AA plates 132, the hot humid air becomes warm humid air and flows through a final fluid conduit 110 before being exhausted into the outdoors through a dryer-air outtake 112.

FIG. 4 depicts the AA 108 which functions to bring two streams of air into close proximity with one another, without mixing of the air streams. In one embodiment, Stream 1 Air is pulled into the dryer system 20 from the outdoors environment via the outdoor-air intake 104, enters the air-to-air heat exchange plate matrix 126 ("matrix") through the AA Stage 1 (131) inlet port 122.

The Stream 1 airflow passes through the matrix and exits the AA 108 through the Stage 1 outlet port 128. Simultaneously, the Stream 2 airflow, traveling through fluid conduit 102 from drying chamber 100, enters the AA 108 through the Stage 2 inlet port 124 and comes into contact with the matrix 126. The Stream 2 airflow then passes through the matrix and exits the AA through the Stage 2 outlet port 130.

Figure 19A:
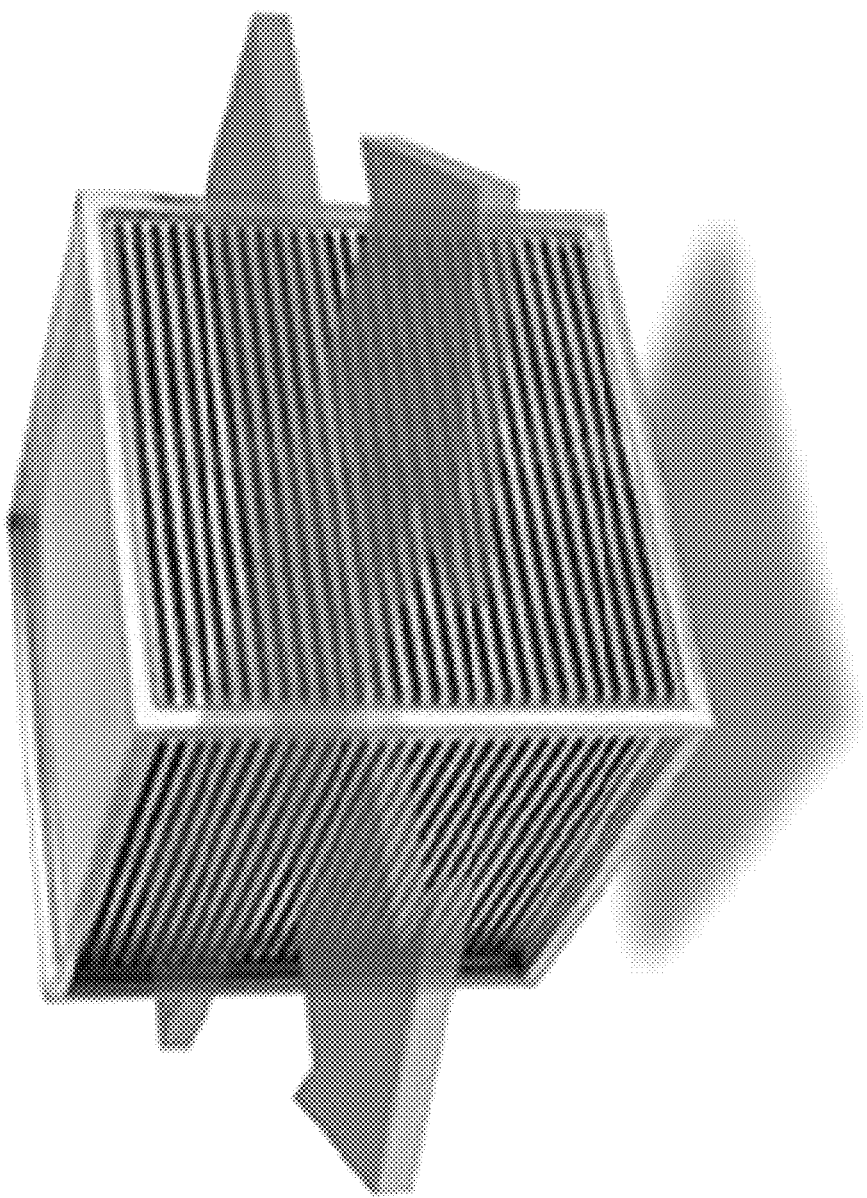
FIG. 19A depicts a plate stack heat exchanger and FIG. 19B depicts an adiabatic wheel heat exchanger.

The matrix 126 functions as a solid heat transfer medium that enables transmission of heat into or out of the air streams in contact with the matrix. As depicted in FIG. 5, the matrix 126 is comprised of a stack of flat plates 132 and spacers 134 which are configured such that air passages 136 are created between the plates. As illustrated by the two views of the matrix 126, Stage 1 (131) and Stage 2 (133), the air passages that are created are oriented in one of two perpendicular directions (as shown in FIG. 19A), corresponding to the Stream 1 airflow and the Stream 2 airflow.

The Stream 1 airflow enters the dryer system 20 and the AA matrix 126 via the outdoor-air intake 104 and travels only through passages 136 in Stage 1 (131) and the Stream 2 airflow enters the AA matrix 126 from the drying chamber 100 and travels only through passages 136 in Stage 2 (133). For industrial scale production, the matrix may be fabricated using methods including, but is not limited to, laser welding, vibration welding, spot welding, or over molding.

FIG. 6 depicts the flow of heat through a flat plate 132 within the matrix 126. As the hot humid air of the Stream 2 airflow from drying chamber 100 passes over a flat plate 132, heat passes from the hot humid air and into the flat plate 132 by conduction, thereby increasing the temperature of the flat plate and decreasing the temperature of the Stream 2 airflow. From the flat plate 132, heat passes by conduction into the cool dry air of the Stream 1 airflow, entering the dryer system 20 from the outdoors, thereby decreasing the temperature of the flat plate 132 and raising the temperature of the Stream 1 airflow.

FIGS. 7A, 7B, and 7C illustrate changes in temperature and pressure throughout the AA 108. FIG. 7A is a cut plot of the temperature and reflects a substantial increase in the temperature of the Stream 1 airflow as well as a decrease in the temperature of hot humid air entering the AA in the Stream 2 airflow. FIG. 7B is a cut plot of the pressure changes across the AA, and reflects a drop in pressure in the Stream 1 airflow as it is heated. Further, a pressure drop is also evident in the Stream 2 airflow as it travels through the AA. FIG. 7C illustrates the flow trajectory and temperature through the AA, showing air cooling and warming, respectively, as it passes through the two separate stages of the AA.

Figure 8:
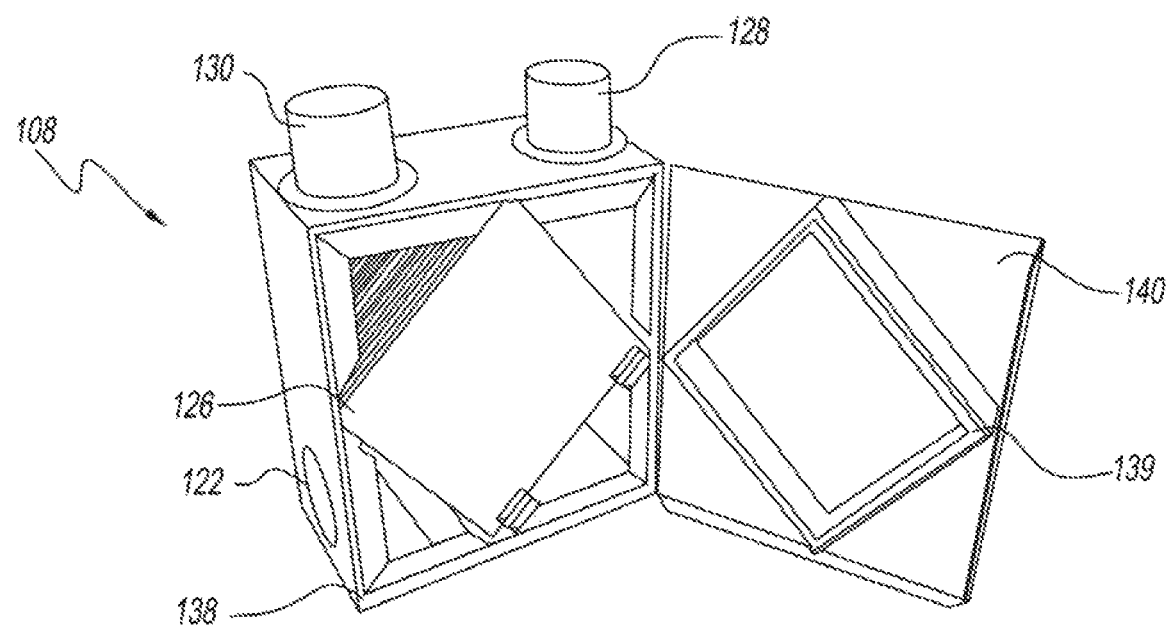
FIG. 8 is a photograph that depicts the internal structure of the air-to-air heat exchanger, with the air-to-air seal and heat exchange plate matrix.

FIG. 8 shows the AA 108 with the internal components exposed. The AA stage 1 inlet port 122 allows air to pass into the AA from fluid conduit 106 into stage 1 (131) of the AA matrix 126 and then to exit the AA via the AA Stage 1 outlet port 128. Similarly, air flowing through fluid conduit 102 enters the AA via the AA stage 2 inlet port 124 (see FIG. 4), passes through Stage 2 (133) of the matrix 126, and reaches the AA stage 2 outlet port 130 where the airflow then exits the AA.

FIG. 8 also depicts the AA maintenance door 140, which provides access to the inside of the AA 108 for cleaning purposes, e.g., excess lint removal. The AA maintenance door seal 138 and the AA matrix seal 139 provide air-tight enclosures to ensure that air from the Stream 1 and Stream 2 airflows remain inside of the AA and separate, without mixing. The AA maintenance door seal 138 is located on the perimeter of the body of the AA and AA maintenance door 140 and creates an air-tight seal when the AA maintenance door is closed. The AA matrix seal 139 is positioned on the inside of the AA maintenance door, and when the door is closed, provides an air-tight fluid chamber around the AA matrix to prevent the mixing of air from the Stream 1 and Stream 2 airflows.

It is understood that the placement of these seals could easily be changed without altering the spirit of the present invention. For instance, the placements could be reversed, such that the AA maintenance door seal 138 would be disposed at the perimeter of the AA maintenance door 140 and such that the AA matrix seal 139 would be disposed at the perimeter of the outermost flat plate 132 of the AA matrix 126. This configuration would likewise result in the desired air-tight fluid chamber comprising the AA and AA matrix and would also prevent mixing of the air from the Stream 1 and Stream 2 airflows.

The LA 116 functions as the primary heat source for the air flowing into the dryer chamber 100 and employed in the drying process, and the LA is configured in such a way as to bring a liquid heat-transfer medium, e.g., water and/or glycol, etc., close to this airflow without direct mixing of the liquid and air fluid flows. The LA 116 shown in FIG. 9 comprises a hydronic heat-transfer mechanism (e.g., coiled pipes, potentially including fins and/or vanes) 152 filled with a hot liquid (i.e., the liquid heat-transfer medium) and is configured to maximize the ratio of the surface area of the components heated by the liquid heat-transfer medium (e.g., the pipes, fins, vanes etc.) to the volume of liquid heat-transfer medium contained in the pipe. Maximizing this surface area to volume ratio optimizes the effectiveness of the hydronic heat-transfer mechanism in transmitting the heat delivered to the LA by the liquid heat-transfer medium. The LA is further configured such that the airflow may pass over the surface area of the hydronic heat-transfer mechanism 152 in order to heat the airflow.

The hydronic heat-transfer mechanism 152 (represented in FIG. 9 as a coiled pipe), located inside of the LA 116, is in fluid communication with the liquid feed pipe 148, liquid feed pipe inlet port 146, liquid return pipe outlet port 142, and liquid return pipe 144, which together comprise a conduit through which the hot liquid heat-transfer medium flows. The hydronic heat-transfer mechanism may also be equipped with fins and/or vanes to increase the total surface area in contact with the air stream. Further the hydronic heat-transfer mechanism 152 may also be made of a material with high thermal conductivity (e.g., metals, metal alloys and metallic and alloy composites).

Figure 10:
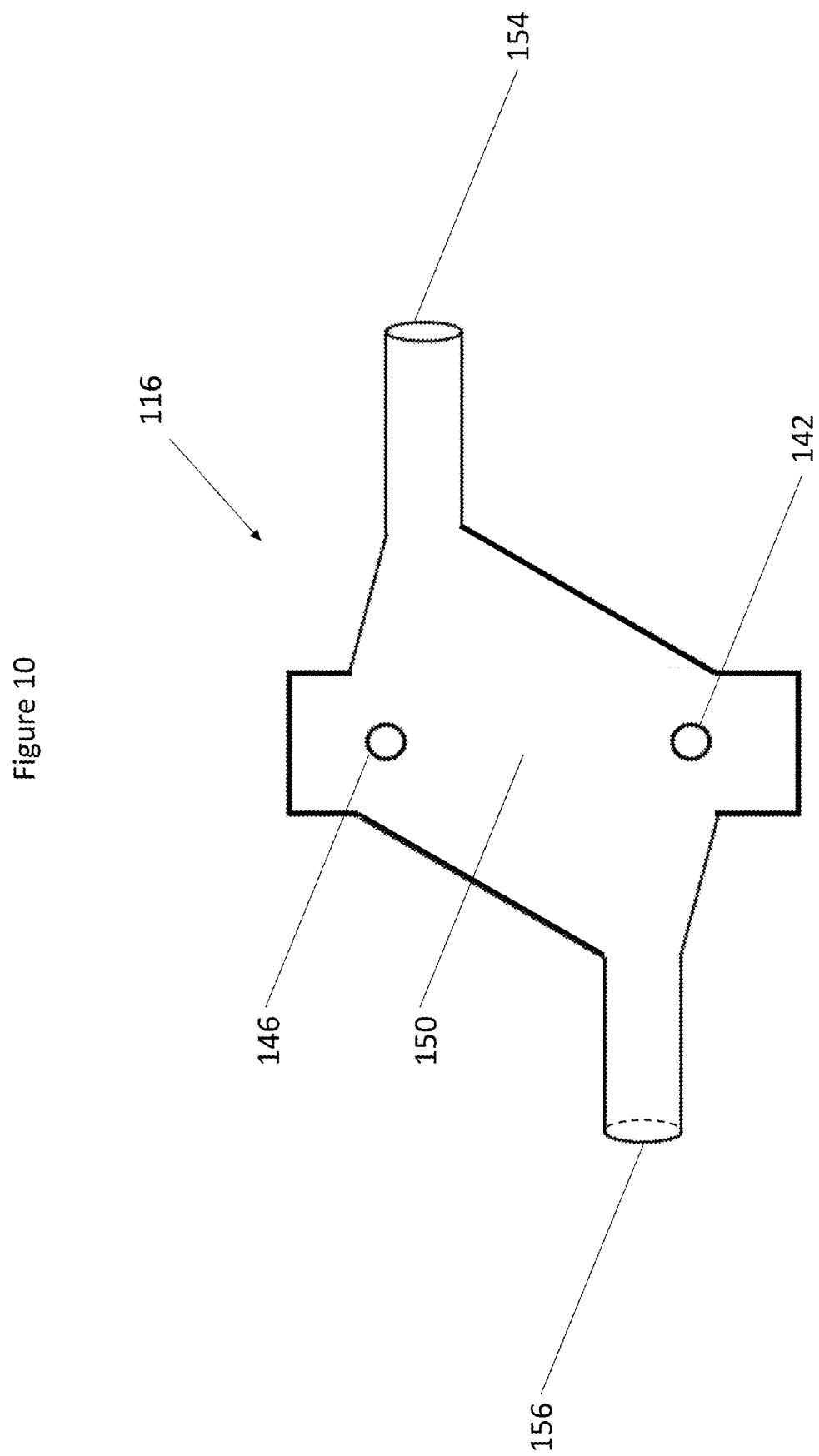
FIG. 10 is a schematic that depicts the general structure of the liquid-to-air heat exchanger from a side view.
Figure 11:
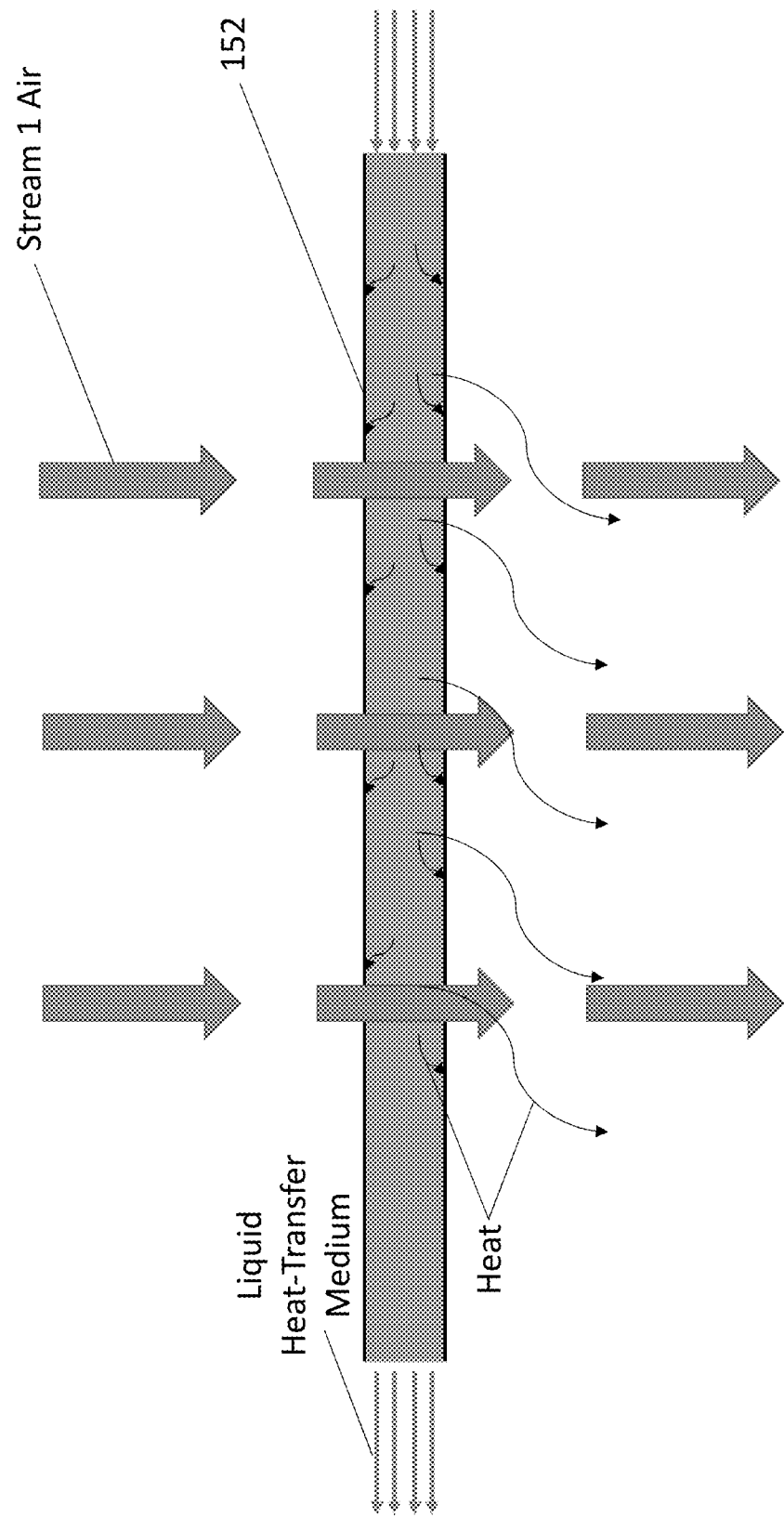
FIG. 11 is a schematic that depicts the general heat flow through the hot liquid pipe of the liquid-to-air heat exchanger.

FIG. 10 depicts a side view of the LA 116, which further comprises the LA airflow inlet port 156, LA heating chamber 150, and LA airflow outlet port 154. The LA airflow inlet port 156 allows the Stream 1 airflow to pass from fluid conduit 114 into the LA 116, where the air comes into contact with and is heated by the hydronic heat-transfer mechanism 152 (as depicted in FIG. 11). The LA airflow outlet port 154 allows hot air to flow from the LA 116 into fluid conduit 118, which is in fluid communication with the drying chamber 100.

In operation, the hot liquid heat-transfer medium, e.g., water, glycol, etc., is stored in a liquid heat-transfer medium storage tank (22 in FIG. 2) and delivered to the liquid feed pipe inlet port 146 by the liquid feed pipe 148. The liquid heat-transfer medium then passes through the liquid feed pipe inlet port 146 to enter the hydronic heat-transfer mechanism 152 and as the hot liquid heat-transfer medium passes through the hydronic heat-transfer mechanism, it loses heat to the hydronic heat-transfer mechanism via conduction, and convection as it travels.

Ultimately, having lost heat to the hydronic heat-transfer mechanism 152, the liquid heat-transfer medium exits the LA 116, through liquid return pipe outlet port 142, at a lower temperature. The cooler liquid heat-transfer medium is then carried away from the LA heating chamber 150 and the liquid return pipe outlet port by the liquid return pipe 144.

Simultaneously, warm dry air passes from fluid conduit 114 through the LA air inlet port 156 into the LA heating chamber 150 where the air comes into contact with the hydronic heat-transfer mechanism 152. Then, the hydronic heat-transfer mechanism, heats the warm dry air that comes into contact with it via conduction, and the heated air warms the rest of the mass of the airflow via convection. Hot dry air then exits the LA heating chamber through the LA air outlet port 154 and travels into fluid conduit 118.

FIG. 11 depicts the heat exchange that occurs inside of the LA heating chamber 150 between the hot liquid heat-transfer medium, the hydronic heat-transfer mechanism and the warm dry air. As the liquid heat-transfer medium passes through the hydronic heat-transfer mechanism 152, heat flows out of the liquid heat-transfer medium and into the pipe wall, thereby cooling the liquid heat-transfer medium. Then, heat passes through the hot pipe wall and through the hydronic heat-transfer mechanism into the warm dry air, thereby heating and increasing the temperature of the air.

Figure 12:
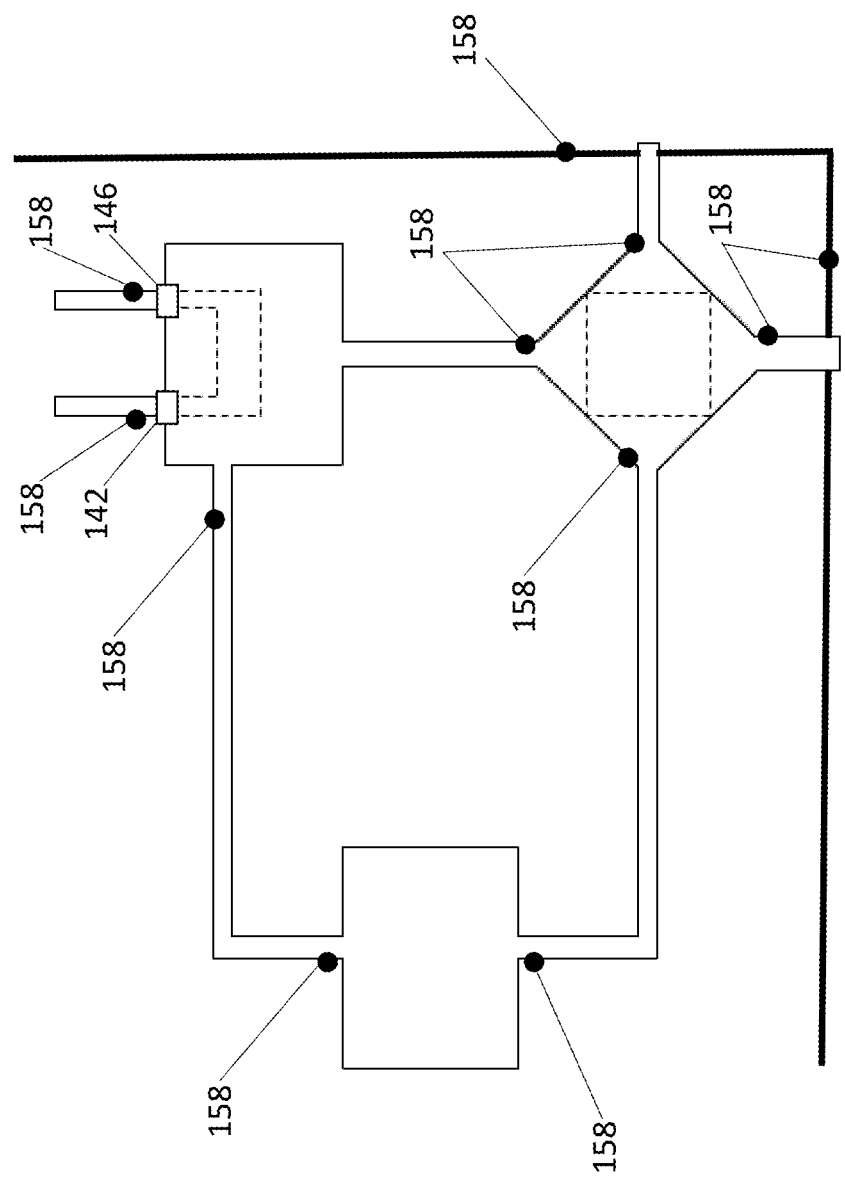
FIG. 12 is a schematic that depicts the location of temperature sensors throughout the present invention.

FIG. 12 illustrates potential locations of temperature and relative humidity sensors ("TRH") 158 throughout the dryer system of the present invention. TRH sensors actively measure, but are not limited to measuring, fluid temperatures and relative humidity ("RH") levels, and provide data that allows the dryer system to achieve better drying efficiency.

In the present invention, TRH sensors are positioned in various places. A TRH may be placed near and upstream to the liquid feed pipe inlet port 146 such that it will read the temperature of the liquid heat-transfer medium as it enters the hydronic heat-transfer mechanism 152. A second TRH may be placed near and downstream to the liquid return pipe outlet port 142 such that it will read the temperature of the liquid heat-transfer medium in the liquid return pipe 144 after having exited the hydronic heat-transfer mechanism 152.

Further, a TRH 158 may be placed near and downstream to the AA Stage 1 outlet port 128 and another TRH may be placed near and downstream to but near AA Stage 2 outlet port 130 to determine air temperature and RH of the air leaving the AA 108 from each of Stage 1 and Stage 2. Additional TRHs may be placed on the outside of the building as well as near and upstream to the AA Stage 1 inlet port 122 to determine the temperature and RH of the air in the outdoors environment prior to being drawn into the dryer system and being heated by the AA.

Another TRH may be placed near and downstream to the LA air outlet port 154 to determine air temperature and RH of the air leaving the LA 116. And, a further TRH may be placed near and downstream to the drying chamber 100 to determine air temperature and RH of air leaving the drying chamber.

Figure 13:
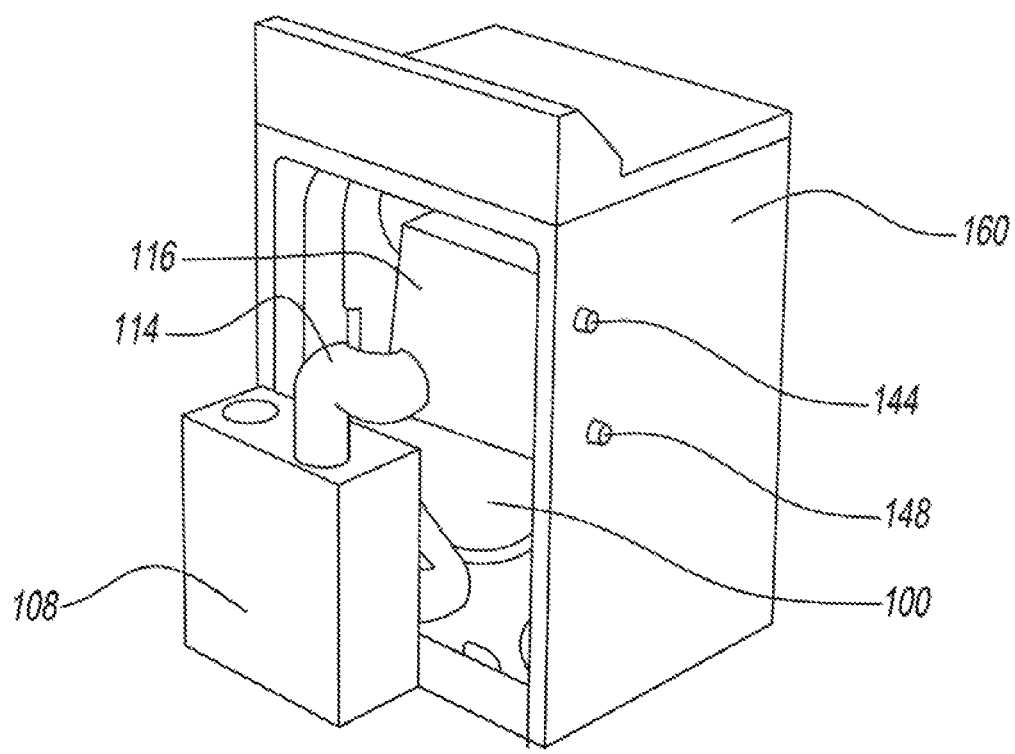
FIG. 13 is a photograph that depicts an exemplary configuration of the present invention.

In one embodiment for application in industrial, commercial and household textiles, fabrics and clothes dryers, the present invention may be contained within a single unit, wherein the AA 108 and LA 116 are located adjacent to the drying chamber 100. FIG. 13 depicts the present invention housed within a single unit. In this embodiment, the AA and the LA may be positioned behind the drying chamber (as depicted in FIG. 13). The AA may also be positioned in a drawer or other accessible compartment within the unit to allow for ease of access for cleaning and lint removal. FIG. 13 also depicts portions of the liquid return pipe 144 and liquid feed pipe 148, which are visible as protruding from the side of the drying chamber casing 160. A portion of the back of the drying chamber is also visible. Similar to conventional clothes drying systems, materials for drying may be loaded from the top or front of the unit.

Figure 14:
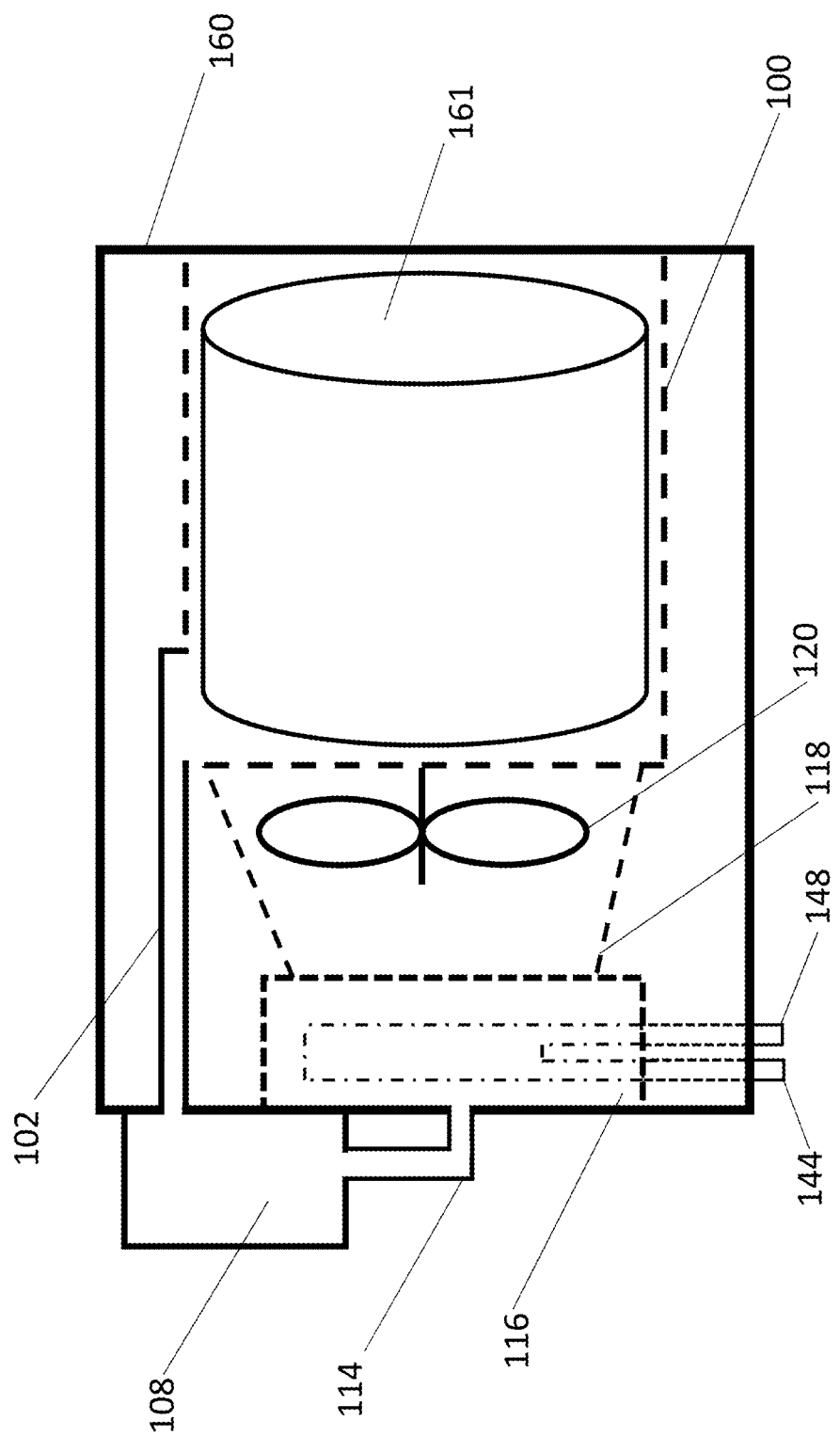
FIG. 14 is a schematic that depicts the top view of an exemplary configuration of the present invention.

FIG. 14 depicts a top view of the embodiment just described for application in industrial, commercial and household textiles, fabrics and clothes dryers. Again, in this embodiment the AA 108 and the LA 116 may be positioned on the back of the unit. This embodiment may further include a rotating drum 161 inside the drying chamber that functions to tumble materials (e.g., fabrics, textiles and clothes) to expedite the drying process.

The LA air outlet port 154 is in fluid communication with fluid conduit 118, which houses the primary blower 120, and the primary blower is positioned such that it may be rotated by the same motor (not depicted) as the rotating drum that is located within the drying chamber 100. The drying chamber 100 is positioned adjacent and downstream to the primary blower.

Figure 15:
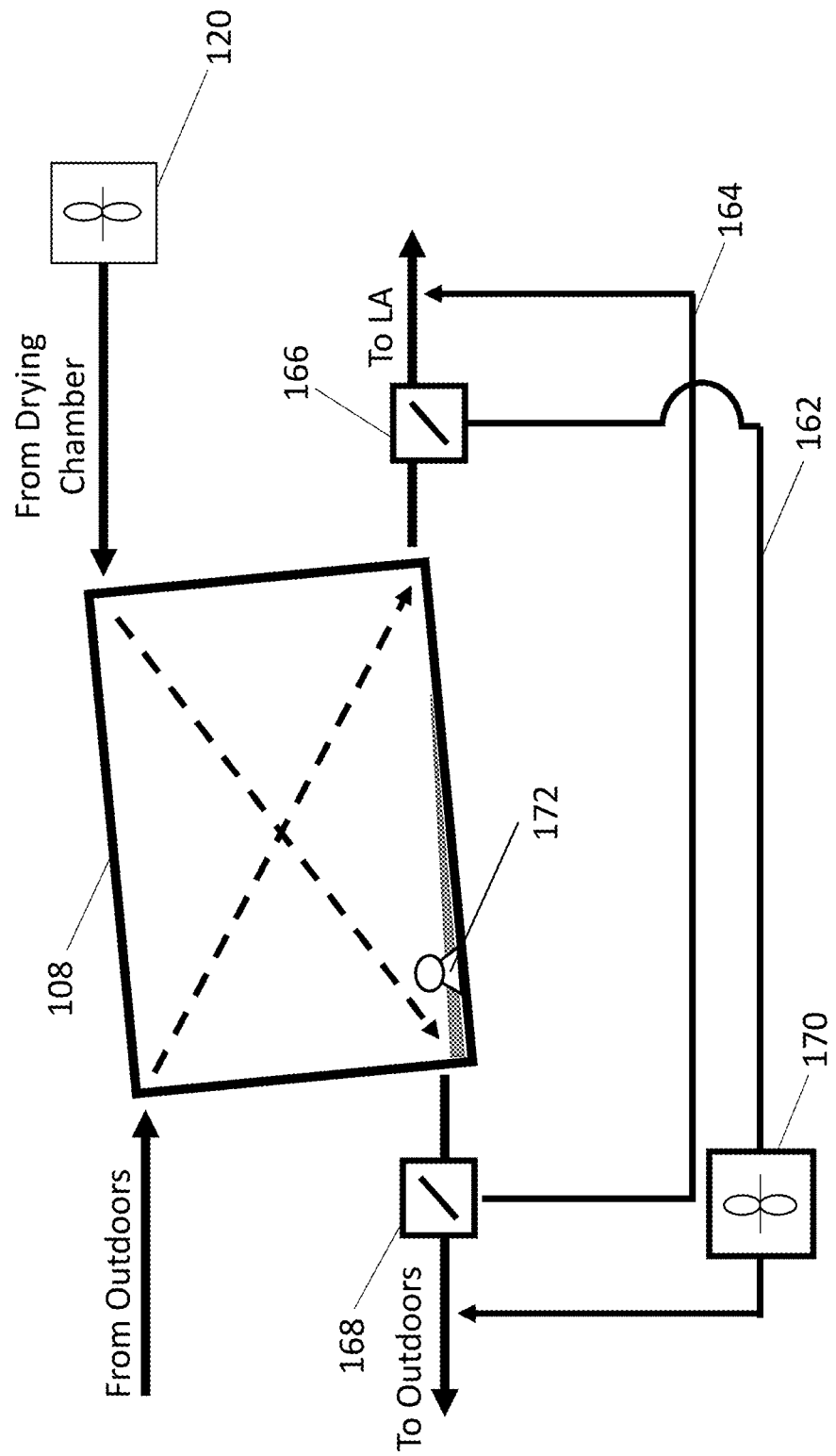
FIG. 15 is a schematic that depicts air flow through the air-to-air heat exchanger in an exemplary configuration of the present invention.

In a further embodiment for application in industrial, commercial and household textiles, fabrics and clothes dryers, the present invention features a hybrid system, wherein the dryer system can intelligently switch between operation of the AA in conventional energy recovery mode and operation of the AA in a "condenser mode," as further described below. FIG. 15 depicts the placement of two or more airflow valves, additional fluid conduits, and an auxiliary blower that enable operation of the present invention in either energy recovery mode or condenser mode.

By enabling the dryer system to intelligently switch between energy recovery mode and condenser mode, the dryer is able to achieve optimal efficiency. Airflow valve 168 is placed downstream of AA Stage 2 air outlet port 130, and air flow valve 166 is placed downstream of AA Stage 1 air outlet port 128 that together allow the Stream 1 airflow to be directed either to the dryer-air outtake 112 through fluid conduit 110 or to the LA 116 through fluid conduit 114.

An auxiliary blower 170 may be placed downstream of airflow valve 166. And, when the dryer system switches to condenser mode operation, air flow valves 166 and 168 are placed in the appropriate setting and auxiliary blower 170 is powered on to move air through Stage 1 of the AA. Fluid conduit 162 connects airflow valve 166 with the auxiliary blower and fluid conduit 110 that is in fluid communication with the dryer-air outtake 112.

Fluid conduit 164 is connected to airflow valve 168 and places air flow valve 168 in fluid communication with fluid conduit 114, which is in further fluid communication with the LA 116. Further, the air flow valves may be configured such that they are mechanically operated by the same motor, but this is not a strict requirement.

Figure 16:
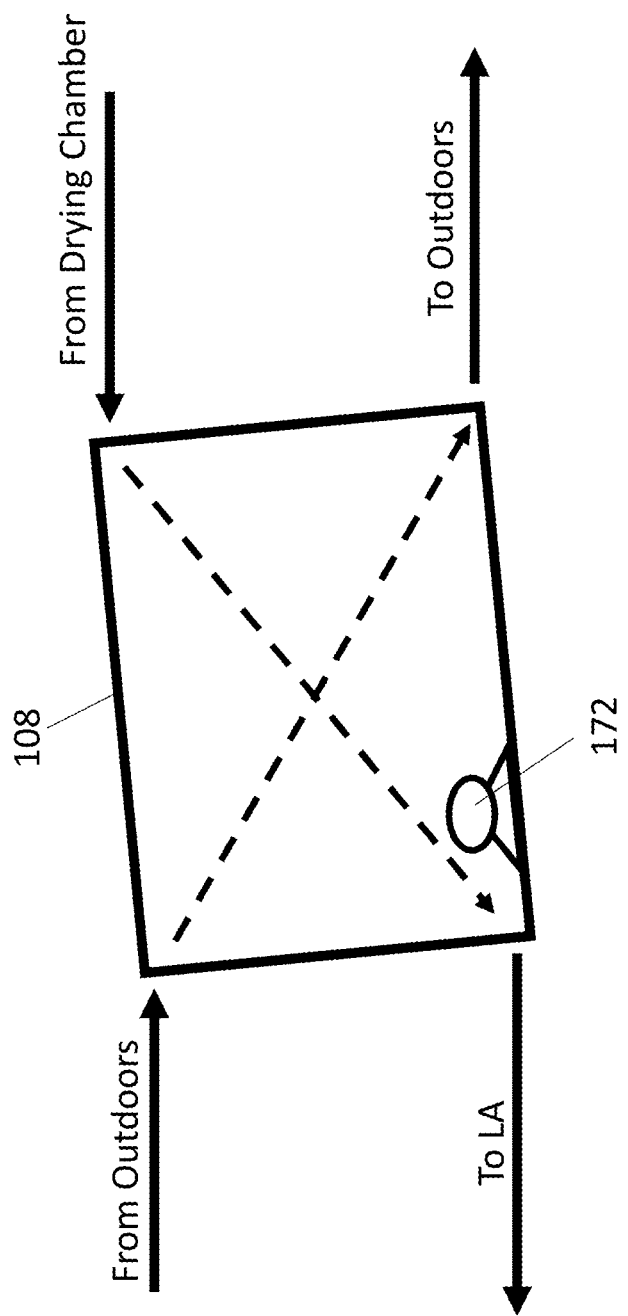
FIG. 16 is a schematic that depicts an exemplary configuration of the air-to-air heat exchanger in the present invention.

As depicted in FIGS. 15 & 16, in condenser mode the AA 108 functions to cool the moisture present in the hot humid air exiting the drying chamber 100 into a condensate that may be removed from the AA by means including, but not limited to, a sump pump 172 or gravity drain. The condenser mode functions best when temperatures in the outdoors environment are between thirty and fifty degrees Fahrenheit, e.g., during wintertime.

FIG. 16 depicts the flow of air through the AA 108 in condenser mode. In condenser mode, Stage 1 of the AA is configured to receive air from the outdoors environment through fluid conduit 106 from the outdoor-air intake 104 and to output air back into the outdoor environment through fluid conduit 110 and the dryer-air outtake 112.

In condenser mode, Stage 2 of the AA is further configured to receive air via fluid conduit 102 from the drying chamber 100 and to output air via fluid conduit 114 to the LA 116. As air flows through the AA differently in condenser mode than in energy recovery mode, an auxiliary blower 170 is necessary to move air through Stage 1 of the AA. The sump pump 172 functions to remove liquid condensate from Stage 2 of the AA.

In condenser mode operation, air from the outdoors environment is pulled through the outdoor-air intake 104 by an auxiliary blower, travels through fluid conduit 106 to Stage 1 of the AA 108, passes through the matrix 126 and then travels through fluid conduit 110 to the dryer-air outtake 112 where it is deposited back into the outdoors environment. Simultaneously, air is pushed out of the drying chamber 100 and through fluid conduit 102 to Stage 2 of the AA, through the matrix 126, and out of the AA, into fluid conduit 114 and on to the LA.

Figure 17A:
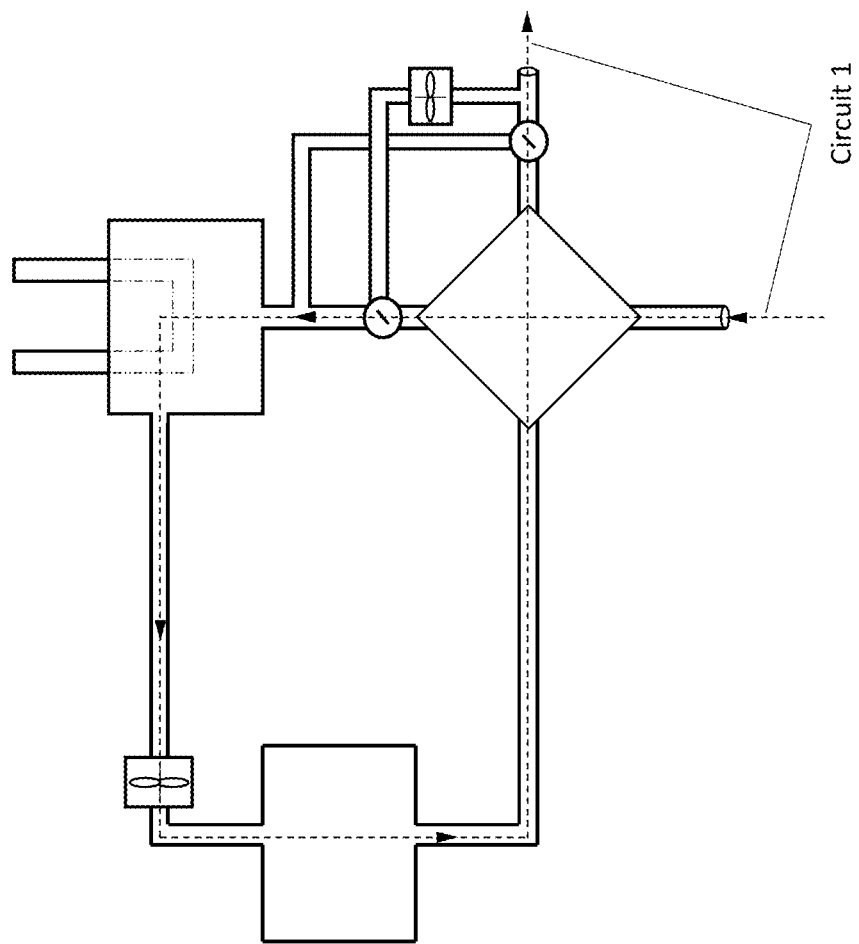
FIG. 17A depicts air flow through the present invention in "heat recovery" mode and FIG. 17B depicts air flow through the present invention in "condenser" mode.
Figure 17B:
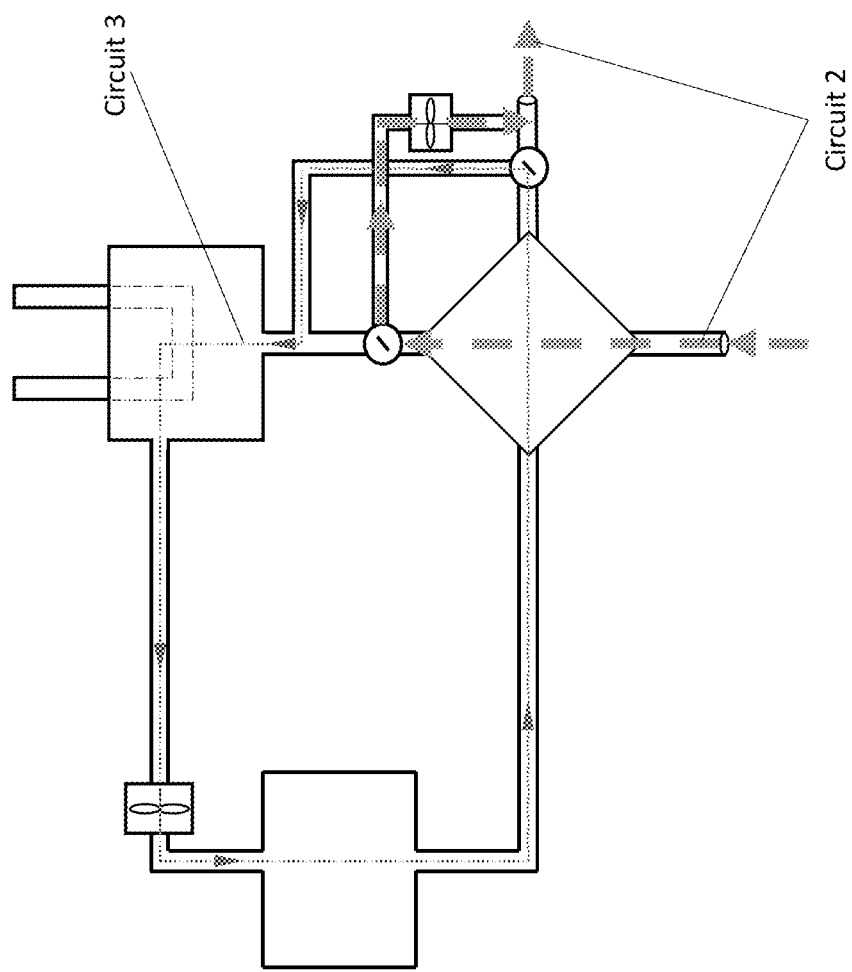

In the hybrid embodiment just described, the additional elements added to the present invention form a total of three independent circuits through which air may travel. FIGS. 17A and 17B depict two schematics of the combination embodiment, showing the present invention in fluid communication with additional fluid conduits 162 and 164, auxiliary blower 170, and airflow valves 166 and 168.

Specifically, FIG. 17A depicts the flow of air through "Circuit 1" of this embodiment, wherein the present invention is configured to function and operated in energy recovery mode. Air flow valves 166 and 168 are positioned such that air will not pass through fluid conduits 162 and 164, and auxiliary blower 170 is powered off. In Circuit 1, air is taken from the outdoors environment, passed through the outdoor-air intake 104, fluid conduit 106 into Stage 1 of the AA 108, through fluid conduit 114 and LA 116, through fluid conduit 118 and primary blower 120, into and out of drying chamber 100, from fluid conduit 102 to Stage 2 of the AA, and then deposited back to the outdoors environment.

FIG. 17B depicts the flow of air through "Circuit 2" and "Circuit 3" of this embodiment, wherein the present invention is configured to and operated in condenser mode. Air flow valves 166 and 168 are configured to direct air flow through fluid conduits 162 and 164, and the primary and auxiliary blowers are both powered on. In Circuit 2, air from the outdoors environment flows through outdoor-air intake 104, through fluid conduit 106 and Stage 1 of the AA 108, through airflow valve 166 into fluid conduit 162, through auxiliary blower 170, and out of the system through fluid conduit 110 and dryer-air outtake 112. Simultaneously, in Circuit 3, air flows from the drying chamber 100 to Stage 2 of the AA, through airflow valve 168 into fluid conduit 164 and then fluid conduit 114, through the LA 116, through fluid conduit 118 to the primary blower 120, and back into the drying chamber.

Figure 18:
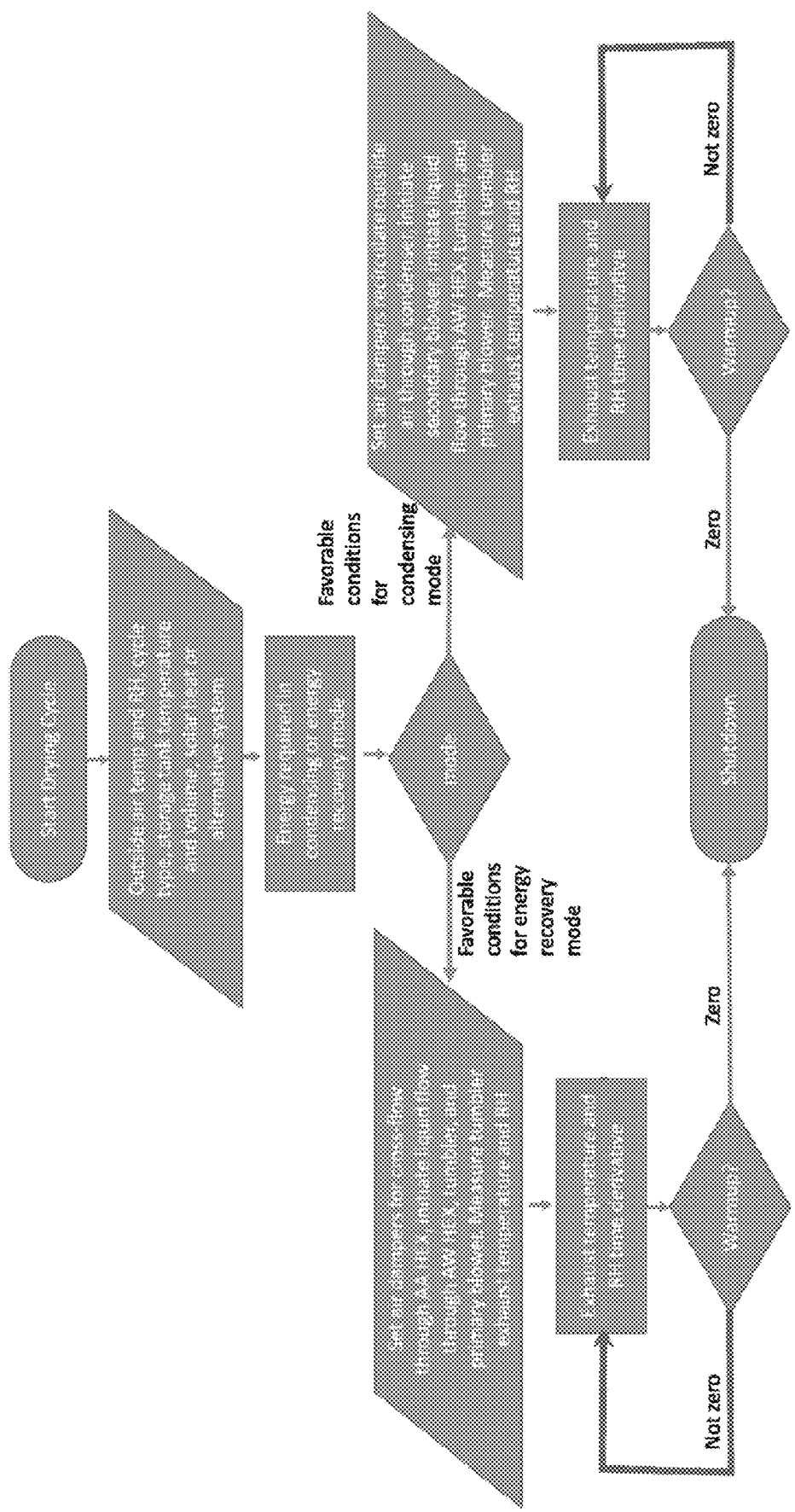
FIG. 18 is a schematic that depicts an exemplary set of control logic for operation of the present invention.

FIG. 18 depicts sample control logic that may be used to operate the hybrid embodiment just described. In operation, a user prompts the system to initiate by starting a drying cycle, thereby triggering the taking of various measurements, such as, but not limited to, outside air temperature, outside relative humidity ("RH"), hot liquid heat-transfer medium storage tank temperature and volume, and the temperature and RH of drying chamber output air located in fluid conduit 102. Then, a calculation is made by inputting the measurements taken into an algorithm to determine the energy required to dry materials using the energy recovery and condensing modes. Based on this calculation, the system selects a drying cycle mode that requires the least amount of energy, and proceeds to follow subsequent control logic as depicted in FIG. 18 for either energy recovery or condensing mode.

After either the energy recovery or condenser mode is selected, various adjustments are made to the system as required by the selected mode. For energy recovery, such adjustments may include, but are not limited to, switching the airflow valves 166 and 168 for cross-flow through the AA 108 as set forth in Circuit 1. For condenser mode, such adjustments may include, but are not limited to, switching the airflow valves 166 and 168 to form Circuit 2 and Circuit 3. After adjustments are made, various aspects of the present invention are simultaneously initiated, including, but not limited to, liquid heat-transfer medium flow through the LA 116, drum 161 rotation, primary blower 120 operation, auxiliary blower 170 operation, and TRH 158 data reading and reporting.

After all system components are initiated, they remain in operation until instructed to shut down, such instructions may include TRH sensor indications that the materials are dry. In one embodiment, the materials are determined to be dry by conditions including, but not limited to, stabilization of exhaust temperature and RH measurements, having reached an average time derivative of zero or approximately zero.

The temperature time derivative of zero or approximately zero indicates that the air passing through the system has lost energy for vaporization. The RH time derivative of zero or approximately zero indicates that the air passing through the system has reached a point of moisture equilibrium, wherein moisture is no longer leaving the materials. Upon observing an average time derivative of RH and temperature of zero or approximately zero, the system shuts down, and material or materials may be removed from the drying chamber.

The embodiments just described may be implemented on, but is not limited to, machines for drying clothes, linen, lumber, textiles, plastics, and minerals. It should be understood that claimed subject matter is not limited to use only within the clothing drying industry, but may also be used in such industries as, but not limited to, the mineral industry, lumber industry, pharmaceutical industry, ship building industry, food processing industry, and in pollution control.

While the embodiments just described include the placement of the primary blower 120 downstream of the LA 116, it should be understood that claimed subject matter is not intended to be limited in scope to the location of the primary blower in relation to the AA 108 and LA, and may be placed upstream or downstream of the LA, AA, or drying chamber 100. Further, it should be understood that claimed subject matter can include the placement of the blower upstream of the AA Stage 1 air inlet port 122.

While the embodiments just described include the use of a sump pump or gravity drain to remove condensate from within the AA 108, it should be understood that claimed subject matter is not intended to be limited to these specific types of drainage system, but may include any type of electric pump, and the condensate need not be removed by the AA by a pump or drain but by any other means sufficient of removing the condensate from within the AA.

It should also be understood that claimed subject matter is not intended to be limited in scope wherein only thermocouple temperature sensors may be used, but that any type of temperature sensor may be used to read temperature as desired by the user.

While the embodiments just described include the use of a blower to create suction to move air throughout the present invention, it should be understood that claimed subject matter is not intended to be limited in scope to only the use of a fan to create an air pressure differential, i.e., suction, but may include any kind of blower or other air movement device known in the art as desired by the user. In addition, it should be understood that the blower or other air movement device to be used in the present invention preferably is operated by a variable-speed motor, but may also be operated by a single-speed motor.

While the embodiments just described entail the use of water and possibly a glycol additive as a heat-transfer medium for heat delivery to the LA 116, it should be understood that claimed subject matter is not intended to be limited in scope to only the use of water as a heat-transfer medium for heat delivery to the LA, but that the heat-transfer medium may be any type of suitable liquid. Further, it should be understood that claimed subject matter need not use a liquid as a heating medium for heat delivery to the LA, but that any type of suitable gas may also be used as a heating medium for heat delivery to the LA.

While the embodiments just described include the use of seven temperature sensors to monitor temperature throughout the system, it should be understood that claimed subject matter is not intended to be limited in scope to the use of only seven temperature sensors, but that this is only an exemplary number of temperature sensors required to monitor the temperature throughout present invention, and any number of temperature sensors may be used to monitor temperature throughout the present invention as desired by the manufacturer and user.

Figure 19B:
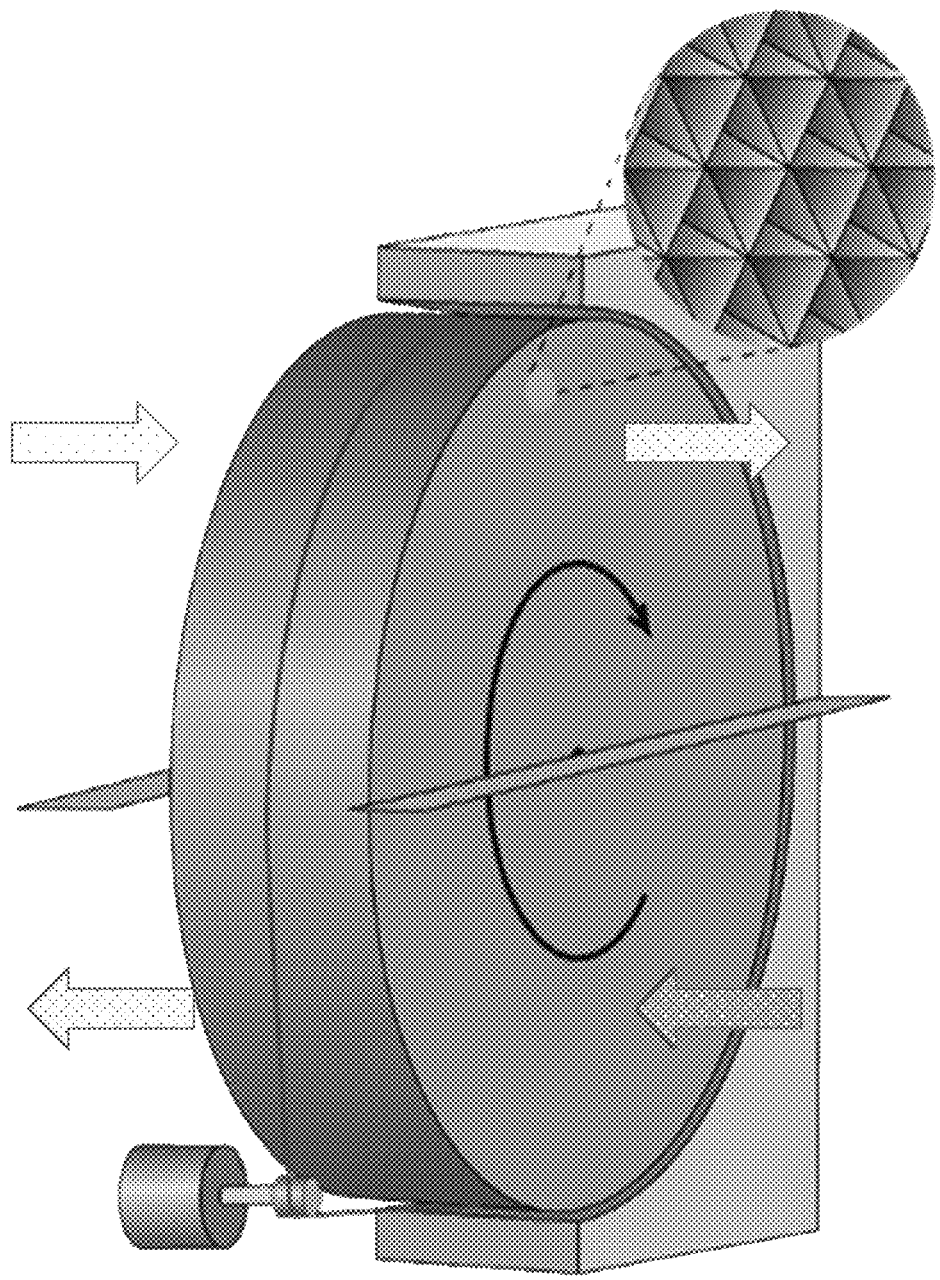

While the embodiments just described include the use of a plate heat exchanger as an AA to transfer heat between Stream 1 and Stream 2, it should also be understood that claimed subject matter is not limited to only the use of a plate heat exchanger, but may also utilize, but is not limited to, an adiabatic heat wheel as the AA heat exchanger (an example of which is shown in FIG. 19B), or any other type of heat exchanger known in the art, as desired by the user.

It should be understood that claimed subject matter is not intended to be limited in scope wherein the particular control logic set forth in FIG. 18 is the only control logic that may be used, but that this sample control logic is only the minimum control logic required to operate the present invention in the combination embodiment, and any control logic may be implemented with the present invention as desired and required by the user for any of the embodiments just described, or any other embodiment not described.

It should further be understood that, although specific embodiments have just been described, the claimed subject matter is not intended to be limited in scope to any particular embodiment or implementation. In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter.

While certain features have been illustrated or described herein, many modifications, substitutions, changes, or equivalents may not occur to those skilled in the art. It is, therefore, to be understood that the appended claims are intended to cover all such modifications or changes as fall within the true spirit of the claimed subject matter.

What is claimed is:

1. A drying machine which comprises:
   an outdoor-air intake, configured to intake and deliver an outdoor air-flow from the outdoors to an air-to-air heat exchanger;
   the air-to-air heat exchanger, configured to receive and heat the outdoor air-flow and to output a heated outdoor air-flow as a first air-flow stream into a first air-flow circuit and into a second air-flow circuit, and wherein the air-to-air heat exchanger is also configured to receive and cool a drying chamber air-flow delivered from a drying chamber and to output a cooled drying chamber air-flow as a second air-flow stream to a third air-flow circuit and to a dryer-air outtake;
   a blower, configured to move the first air-flow stream through the first air-flow circuit and to move the second air-flow stream through the third air-flow circuit;
   an auxiliary blower, configured to move the first air-flow stream through the second air-flow circuit;
   a liquid-to-air heat exchanger, configured to heat the first air-flow stream within the first air-flow circuit, to heat the second air-flow stream within the third air-flow circuit, and to deliver the heated first and second air-flow streams to the drying chamber;
   the drying chamber, configured to receive and to enable the heated first and second air-flow streams to deliver heat to and dry a material located within the drying chamber, wherein the heated first and second air-flow streams absorb humidity evaporated from the material as it dries, thereby cooling and humidifying the first and second air-flow streams, and wherein the blower is configured to move the cooled and humidified first and second air-flow streams from the drying chamber to the air-to-air heat exchanger as the drying chamber air-flow stream;
   the dryer-air outtake, configured to output to the outdoors the second air-flow stream from the first air-flow circuit and the first air-flow stream from the second air-flow circuit;
   a first air-flow valve located downstream from the air-to-air heat exchanger and upstream to the liquid-to-air heat exchanger and configured to switch the first air flow stream between the first air-flow circuit and the second air-flow circuit;
   a second air-flow valve located downstream from the air-to-air heat exchanger and upstream to the dryer-air outtake and configured to switch the second air-flow stream between the first air-flow circuit and the third air-flow circuit; and
   one or more fluid conduits and fluid ports that connect to and form the first, second, and third air-flow circuits, each of which establish fluid communication respectively between the outdoor-air intake, the air-to-air heat exchanger, the liquid-to-air heat exchanger, the drying chamber, the blower, the auxiliary blower, and the dryer-air outtake.

2. The drying machine of claim 1, wherein the air-to-air heat exchanger is configured to enable the outdoor air-flow and the drying chamber air-flow to transfer heat between the outdoor air-flow and drying chamber air-flow across one or more thermal gradients within the air-to-air heat exchanger, without any direct contact or mixing of the outdoor and drying chamber air-flows.

3. The drying machine of claim 1, wherein the liquid-to-air heat exchanger is configured to receive the first and second air-flow streams from the air-to-air heat exchanger and a flow of liquid heat transfer medium, wherein the liquid heat transfer medium is heated by an independent heat source, and the first and second air-flow streams and the flow of liquid heat transfer medium are brought into close proximity within the liquid-to-air heat exchanger, enabling heat transfer between the first and second air-flow streams and the flow of liquid heat transfer medium without any direct contact or mixing of the first and second air-flow streams and the flow of liquid heat transfer medium.

4. The drying machine of claim 3, wherein the liquid-to-air heat exchanger employs one or more of water and glycol as the liquid heat transfer medium.

5. The drying machine of claim 3, wherein the liquid-to-air heat exchanger employs an independent heat source including one or more of a boiler, a combined heat and power system, an electrical power generator, a ground-source heat pump, an incinerator, a thermal-solar panel, a thermo-electrical panel, a geothermal heat source, or other heat source.

6. The drying machine of claim 1, wherein the air-to-air heat exchanger is configured to output exhaust air to an outdoor environment.

7. The drying machine of claim 1, wherein the air-to-air heat exchanger includes one or more of a plate heat exchanger and an adiabatic heat wheel.

8. The drying machine of claim 1, wherein first and second airflow valves are configured to cooperatively operate the drying machine in at least one of two modes, wherein a first mode includes operation of the first air-flow circuit and wherein a second mode includes operation of the second and third air-flow circuits.

9. The drying machine of claim 8, wherein, in the first mode, the air-to-air heat exchanger is configured to operate in a standard mode as an air-to-air heat exchanger, the outdoor air-flow being drawn into the drying machine, through a first stage of the air-to-air heat exchanger from the outdoor-air intake and being circulated through the first air-flow circuit and then through a second stage of the air-to-air heat exchanger prior to being exited from the drying machine via the dryer-air outtake as exhaust.

10. The drying machine of claim 8, wherein, in the second mode, the air-to-air heat exchanger is configured to operate in an auxiliary mode as a condenser, the outdoor air-flow being drawn into a first stage of the air-to-air heat exchanger from the outdoor-air intake and being circulated through the second air-flow circuit prior to being exited from the air-to-air heat exchanger via the dryer-air outtake as exhaust, and a second airflow being drawn into a second stage of the air-to-air heat exchanger from the drying chamber and being circulated and continuously re-circulated within the third air-flow circuit.

11. The drying machine of claim 8, wherein operation in the first or second modes is selected to use the least amount of energy required for drying, wherein the energy required for drying a load of materials is calculated using one or more of outdoor-air temperature, indoor-air temperature, outdoor-air relative humidity, indoor-air relative humidity, temperature of a liquid heat-transfer medium and volume of a liquid heat-transfer medium storage tank.

12. The drying machine of claim 1, further comprising a network of temperature and relative humidity sensors for detecting the temperature and relative humidity of air passing into and out of the air-to-air heat exchanger, into and out of the liquid-to-air heat exchanger, into and out of the drying chamber, wherein the temperature and relative humidity sensors are configured to provide one or more temperature and relative humidity signals to a logic control circuit.

13. A drying machine which comprises:
an outdoor-air intake, configured to intake and deliver an outdoor air-flow from the outdoors to an air-to-air heat exchanger;
the air-to-air heat exchanger, configured to receive and heat the outdoor air-flow and to output a heated outdoor air-flow as a first air-flow stream into a first air-flow circuit and into a second air-flow circuit, and wherein the air-to-air heat exchanger is also configured to receive and cool a drying chamber air-flow delivered from a drying chamber and to output a cooled drying chamber air-flow as a second air-flow stream to a third air-flow circuit and to a dryer-air outtake;
a blower, configured to move the first air-flow stream through the first air-flow circuit and to move the second air-flow stream through the third air-flow circuit;
an auxiliary blower, configured to move the first air-flow stream through the second air-flow circuit;
a liquid-to-air heat exchanger, configured to heat the first air-flow stream within the first air-flow circuit, to heat the second air-flow stream within the third air-flow circuit, and to deliver the heated first and second air-flow streams to the drying chamber;
the drying chamber comprising a rotating drum, configured to receive and to enable the heated first and second air-flow streams to deliver heat to and dry a material located within the drying chamber, wherein the heated first and second air-flow streams and absorb humidity evaporated from the material as it dries, thereby cooling and humidifying the first and second air-flow streams, and wherein the blower is configured to move the cooled and humidified first and second air-flow streams from the drying chamber to the air-to-air heat exchanger as the drying chamber air-flow stream;
the dryer-air outtake, configured to output to the outdoors the second air-flow stream from the first air-flow circuit and the first air-flow stream from the second air-flow circuit;
a first air-flow valve located downstream from the air-to-air heat exchanger and upstream to the liquid-to-air heat exchanger and configured to switch the first air flow stream between the first air-flow circuit and the second air-flow circuit;
a second air-flow valve located downstream from the air-to-air heat exchanger and upstream to the dryer-air outtake and configured to switch the second air-flow stream between the first air-flow circuit and the third air-flow circuit; and
one or more fluid conduits and fluid ports that connect to and form the first, second, and third air-flow circuits, each of which establish fluid communication respectively between the outdoor-air intake, the air-to-air heat exchanger, the liquid-to-air heat exchanger, the drying chamber, the blower, the auxiliary blower, and the dryer-air outtake.

14. The drying machine of claim 13, wherein the air-to-air heat exchanger is configured to enable the outdoor air-flow and the drying chamber air-flow to transfer heat between the outdoor air-flow and drying chamber air-flow across one or more thermal gradients within the air-to-air heat exchanger, without any direct contact or mixing of the outdoor and drying chamber air-flows.

15. The drying machine of claim 13, wherein the liquid-to-air heat exchanger is configured to receive the first and second air-flow streams from the air-to-air heat exchanger and a flow of liquid heat transfer medium, wherein the liquid heat transfer medium is heated by an independent heat source, and the first and second air-flow streams and the flow of liquid heat transfer medium are brought into close proximity within the liquid-to-air heat exchanger, enabling heat transfer between the first and second air-flow streams and the flow of liquid heat transfer medium without any direct contact or mixing of the first and second air-flow streams and the flow of liquid heat transfer medium.

16. The drying machine of claim 15, wherein the liquid-to-air heat exchanger employs one or more of water and glycol as the heat transfer medium.

17. The drying machine of claim 15, wherein the liquid-to-air heat exchanger employs an independent heat source including one or more of a boiler, a combined heat and power system, an electrical power generator, a ground-source heat pump, an incinerator, a thermal-solar panel, a thermo-electrical panel, a geothermal heat source, or other heat source.

18. The drying machine of claim 13, wherein the air-to-air heat exchanger is configured to output exhaust air to an outdoor environment.

19. The drying machine of claim 13, wherein the air-to-air heat exchanger includes one or more of a plate heat exchanger and an adiabatic heat wheel.

20. The drying machine of claim 13, wherein first and second airflow valves are configured to cooperatively operate the drying machine in at least one of two modes, wherein a first mode includes operation of the first air-flow circuit and wherein a second mode includes operation of the second and third air-flow circuits.

21. The drying machine of claim 13, wherein, in the first mode, the air-to-air heat exchanger is configured to operate in a standard mode as an air-to-air heat exchanger, the outdoor air-flow being drawn into the drying machine, through a first stage of the air-to-air heat exchanger from the outdoor-air intake and being circulated through the first air-flow circuit and then through a second stage of the air-to-air heat exchanger prior to being exited from the drying machine via the dryer-air outtake as exhaust.

22. The drying machine of claim 13, wherein, in the second mode, the air-to-air heat exchanger is configured to operate in an auxiliary mode as a condenser, the outdoor air-flow being drawn into a first stage of the air-to-air heat exchanger from the outdoor-air intake and being circulated through the second air-flow circuit prior to being exited from the air-to-air heat exchanger via the dryer-air outtake as exhaust, and a second airflow being drawn into a second stage of the air-to-air heat exchanger from the drying chamber and being circulated and continuously re-circulated within the third air-flow circuit.

23. The drying machine of claim 20, wherein operation in the first or second modes is selected to use the least amount of energy required for drying, wherein the energy required for drying a load of materials is calculated using one or more of outdoor-air temperature, indoor-air temperature, outdoor-air relative humidity, indoor-air relative humidity, temperature of the liquid heat-transfer medium and volume of a liquid heat-transfer medium storage tank.

24. The drying machine of claim 14, further comprising a network of temperature and relative humidity sensors for detecting the temperature and relative humidity of air passing into and out of the air-to-air heat exchanger, into and out of the liquid-to-air heat exchanger, into and out of the drying chamber, wherein the temperature and relative humidity sensors are configured to provide one or more temperature and relative humidity signals to a logic control circuit.

* * * * *